(12) United States Patent
Chaum

(10) Patent No.: US 6,318,137 B1
(45) Date of Patent: Nov. 20, 2001

(54) ELECTRONIC LOCK THAT CAN LEARN TO RECOGNIZE ANY ORDINARY KEY

(75) Inventor: David Chaum, 328 Guinda St., Palo Alto, CA (US) 94301

(73) Assignee: David Chaum, Sherman Oaks, CA (US)

(*) Notice: Subject to any disclaimer, the term of this patent is extended or adjusted under 35 U.S.C. 154(b) by 0 days.

(21) Appl. No.: 09/286,980

(22) Filed: Apr. 6, 1999

Related U.S. Application Data

(60) Provisional application No. 60/081,083, filed on Apr. 8, 1998, and provisional application No. 60/089,439, filed on Jun. 16, 1998.

(51) Int. Cl.[7] .............................. E05B 49/00; G05B 19/02
(52) U.S. Cl. ...................... 70/278.3; 70/278.2; 70/278.1; 70/283.1; 340/5.67
(58) Field of Search ................................ 70/278.2, 278.3, 70/278.1, 278.7, 283.1; 340/825.31, 5.67, 5.2

(56) References Cited

U.S. PATENT DOCUMENTS

| | | |
|---|---|---|
| 3,500,326 | 3/1970 | Benford . |
| 3,639,906 | 2/1972 | Tritsch . |
| 3,782,148 | 1/1974 | Goldman . |
| 4,250,533 * | 2/1981 | Nelson . |
| 4,453,161 * | 6/1984 | Lemelson ........................ 340/825.31 |
| 4,712,398 * | 12/1987 | Clarkson et al. ...................... 70/276 |
| 4,791,280 * | 12/1988 | O'Connell et al. ............. 340/825.31 |
| 4,864,292 * | 9/1989 | Nieuwkoop ...................... 340/825.31 |
| 4,868,559 | 9/1989 | Pinnow ........................... 340/825.31 |
| 5,117,097 * | 5/1992 | Kimura et al. . |
| 5,132,661 * | 7/1992 | Pinnow ........................... 340/825.31 |
| 5,176,015 * | 1/1993 | Sussina ................................ 70/340 |
| 5,287,098 | 2/1994 | Janssen . |
| 5,337,043 * | 8/1994 | Gokcebay ....................... 340/825.31 |
| 5,543,665 | 8/1996 | Demarco . |
| 5,552,777 * | 9/1996 | Gokcebay et al. .............. 340/825.31 |
| 5,691,711 | 11/1997 | Jorgensen ........................... 340/5.67 |
| 5,870,915 * | 2/1999 | D'Hunt ................................ 70/277 |
| 6,000,609 * | 12/1999 | Gokcebay et al. .............. 340/825.31 |

* cited by examiner

Primary Examiner—Darnell Jayne
(74) Attorney, Agent, or Firm—Knobbe, Martens, Olson & Bear, LLP

(57) ABSTRACT

An electronic lock that can be pre-programmed or trained in the field to recognize ordinary flat metal keys by sensing their shape and comparing to a database is disclosed. The lock can be contained in standard configurations for door locks, communicates with external systems, provides control logic for querying and amending its database of allowed keys and rules, provides controlled access to logs of selected data, allows convenient but protected access to replacement batteries, can have all its electronics in the rotatable plug, can communicate and obtain power from devices in the adjacent door jam, can recognize special series key-blanks, can receive coded information entered using an unknown key that makes it useable, can be operated without a key to gain access with a code, can resist manipulation of the latching mechanism can unlatch with very low power requirements, and provides for integration of almost all mechanism in silicon.

15 Claims, 18 Drawing Sheets

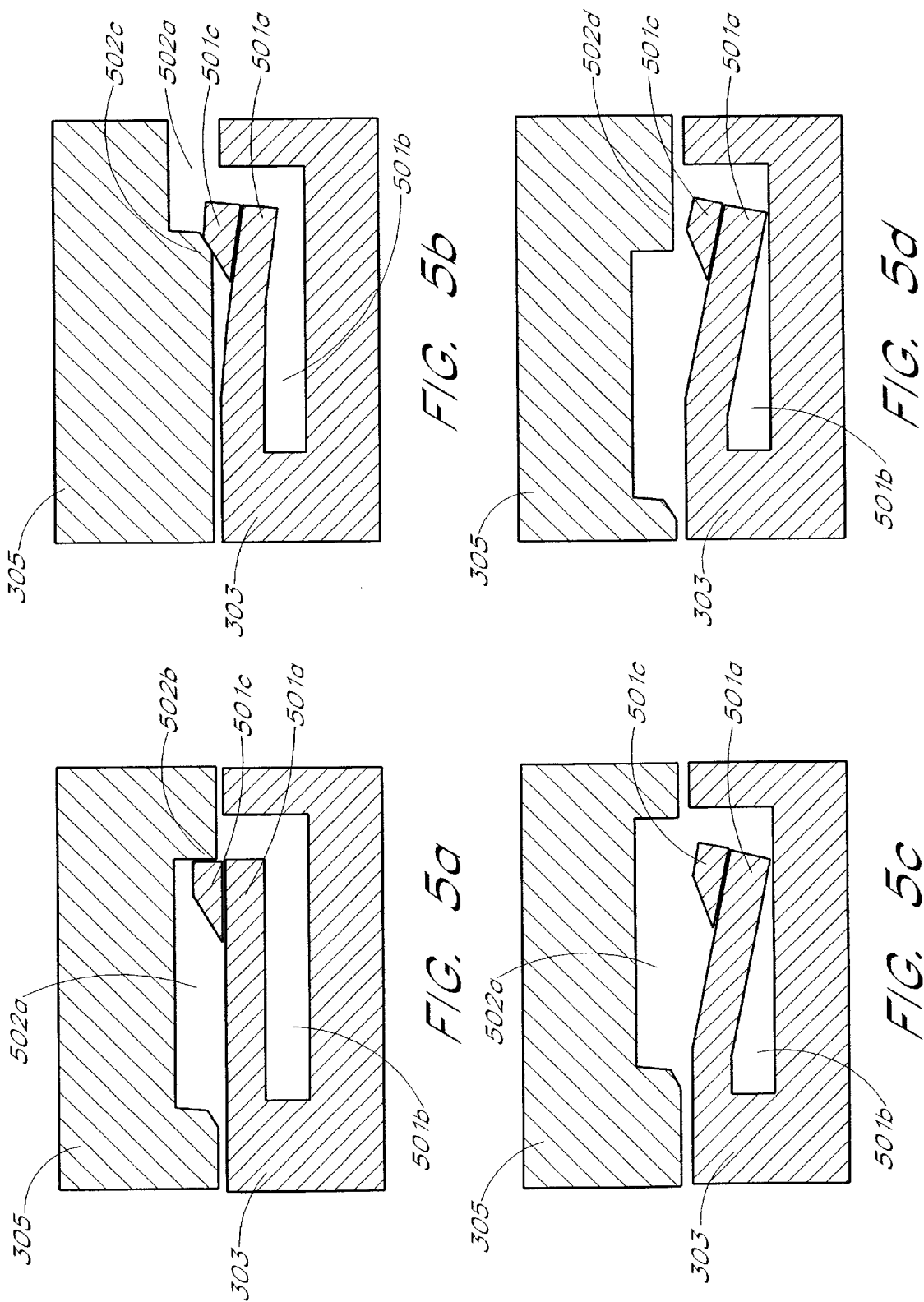

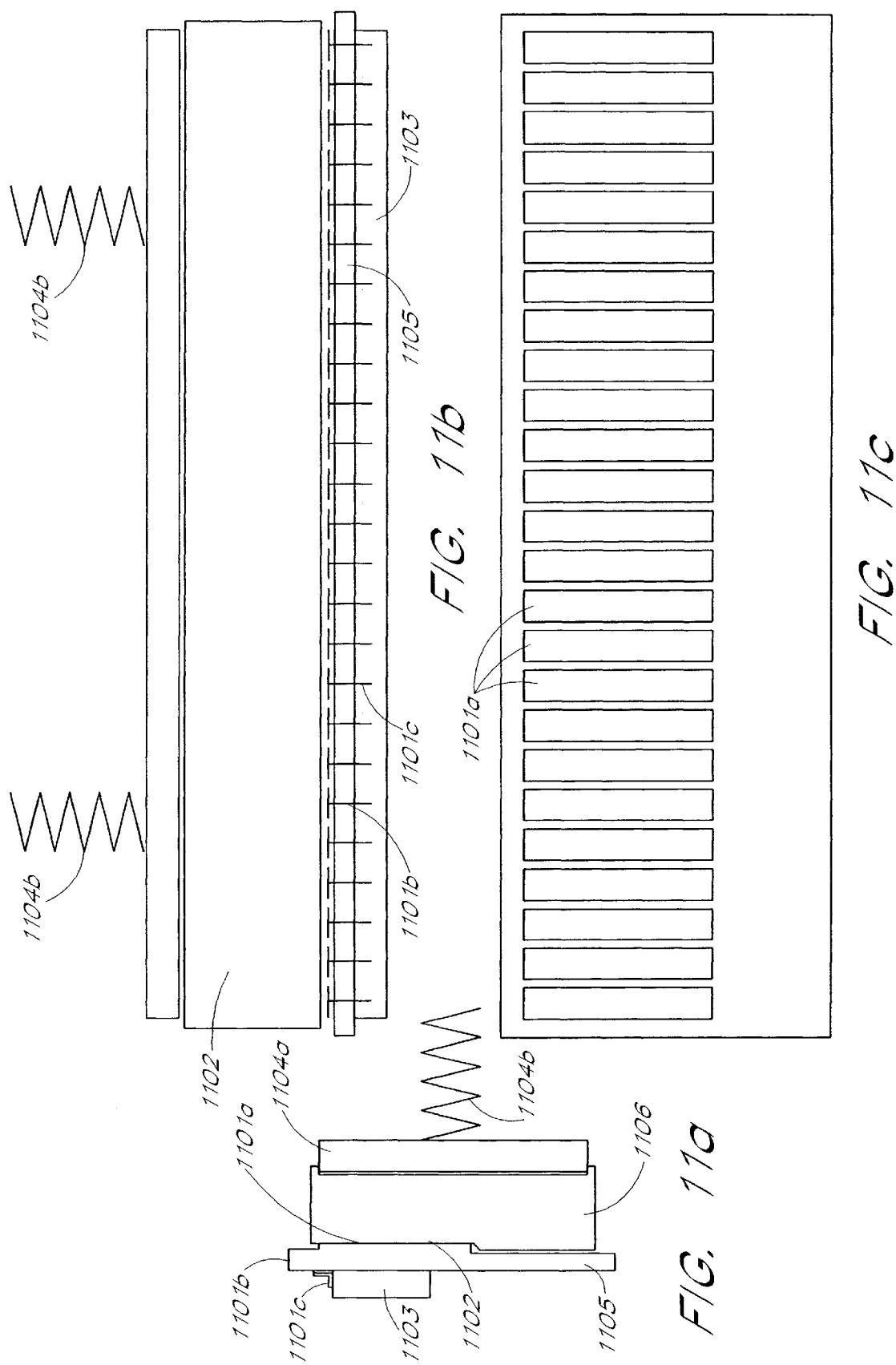

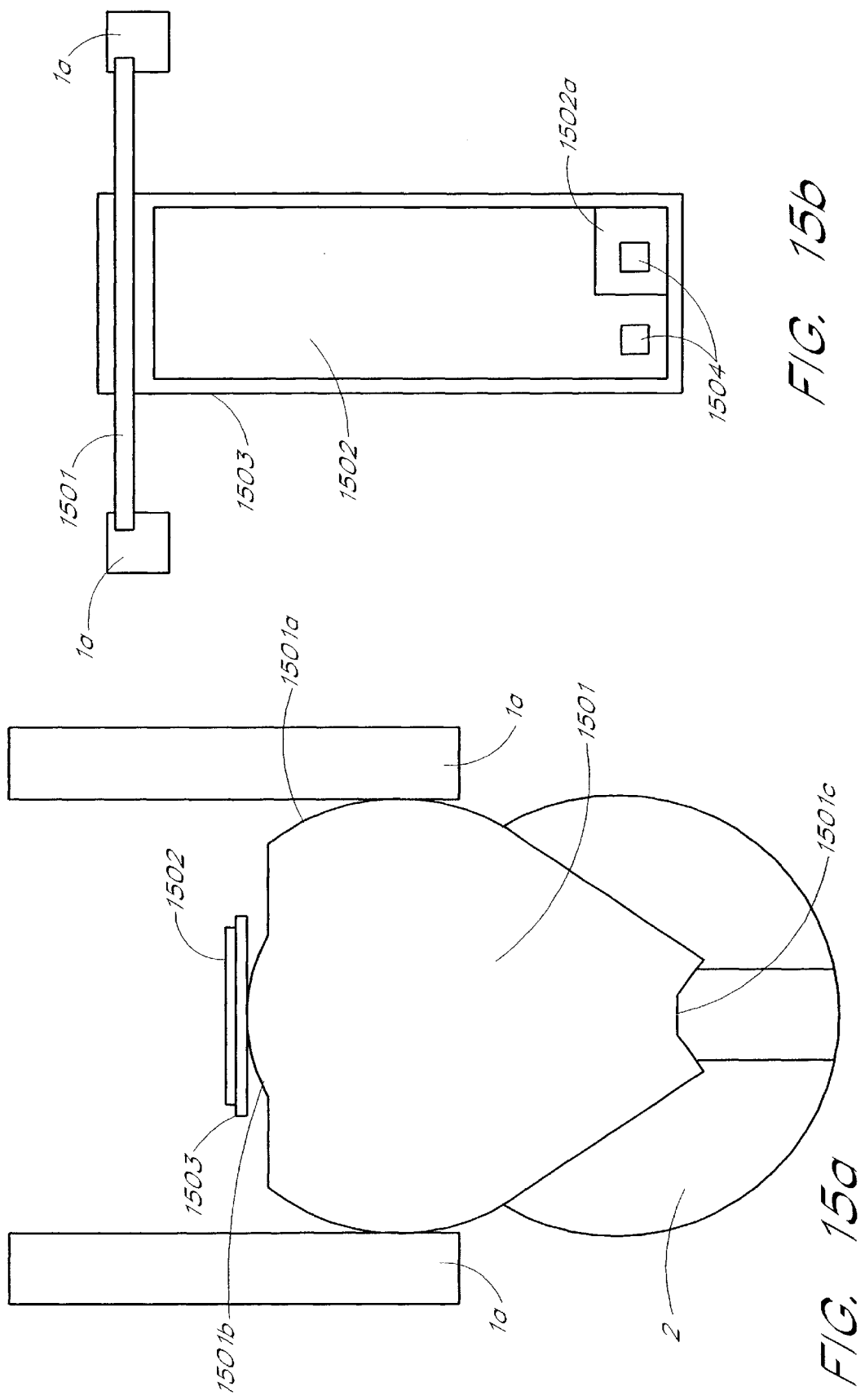

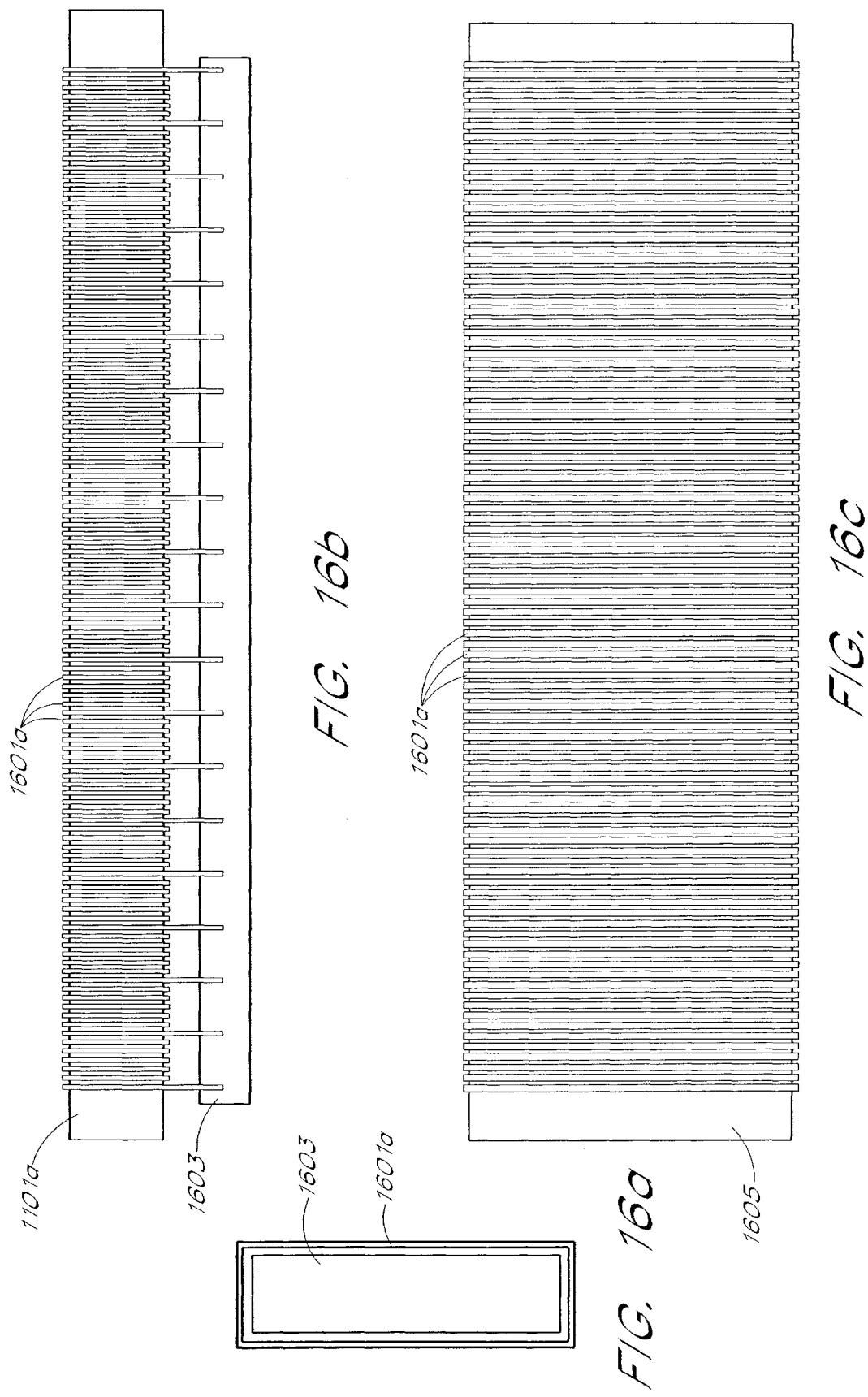

ELECTRONIC LOCK THAT CAN LEARN TO RECOGNIZE ANY ORDINARY KEY

Priority is hereby claimed based on U.S. Provisional Applications, by the present applicant, entitled "Electronic lock for any key," U.S. PTO 60/081083, dated Apr. 8, 1998, and "Electronic lock for existing metal keys," U.S. PTO 60/089439, dated Jul. 16, 1998.

BACKGROUND OF THE INVENTION

1. Field of the Invention

This invention relates to locking devices, and more specifically to electronic sensing of physical key patterns, electronic latching, and general configurations for electronic locks.

2. Description of Prior Art

Access control devices, that involve physical tokens carried by the persons who may wish to gain access, fall into two categories. One uses tokens requiring electronic means of reading, such as magnetic stripe cards, smart cards, keys containing chips, or other elements encoding and/or communicating information electromagnetically. The other, which is the subject of this invention, uses tokens originally intended to be read by mechanical means. Most people in the developed world carry with them many such access tokens—in the form of metal keys.

There are a variety of widely appreciated deficiencies or problems with mechanical key lock systems:

- Many people would prefer to carry far fewer keys than they must today.
- Individual keys cannot usually be revoked, requiring the change of locks and distribution of an new keys, even if only one key may be in the wrong hands.
- Most locks can be picked readily—using tools and techniques that are apparently available beyond the professional locksmith community.
- Temporary users may not return keys issued them, such as with keys for hotels and rental cars.
- Keys must often be left "under the doormat" or entry obtained in some other way, since keys must be physically present at the time of entry.
- Keys must be physically returned by previous users and provided to new users.
- There is record neither of who has gained access nor when.

The present invention has the solution to the above problems among its objects. Other objects, features, and advantages of the present invention will be appreciated when the present description and appended claims are read in conjunction with the drawing figurers.

BRIEF DESCRIPTION OF THE DRAWING FIGURES

FIGS. 4a–d shows sections of spring-driven cams cooperating in the lock of FIG. 3, all in accordance with the teachings of the present invention.

FIGS. 5a–d shows sectional views of a lever arm and plate actuator mechanism in various states of operations in accordance with the teachings of the present invention.

Figure 6:
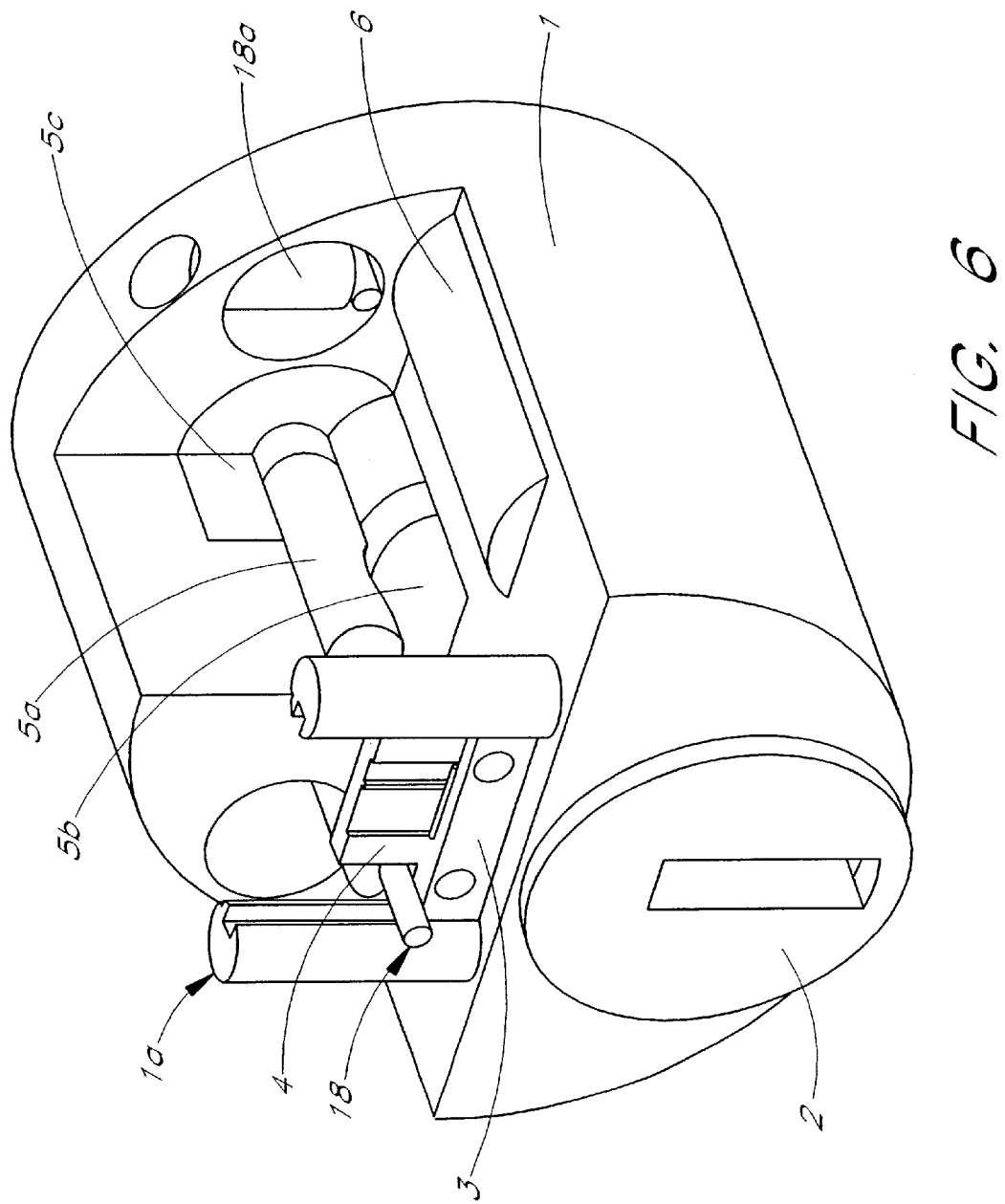

FIG. 6 shows a cutaway and sectional projections from the upper front corner of an electronic lock in accordance with the teachings of the present invention.

Figure 7A:
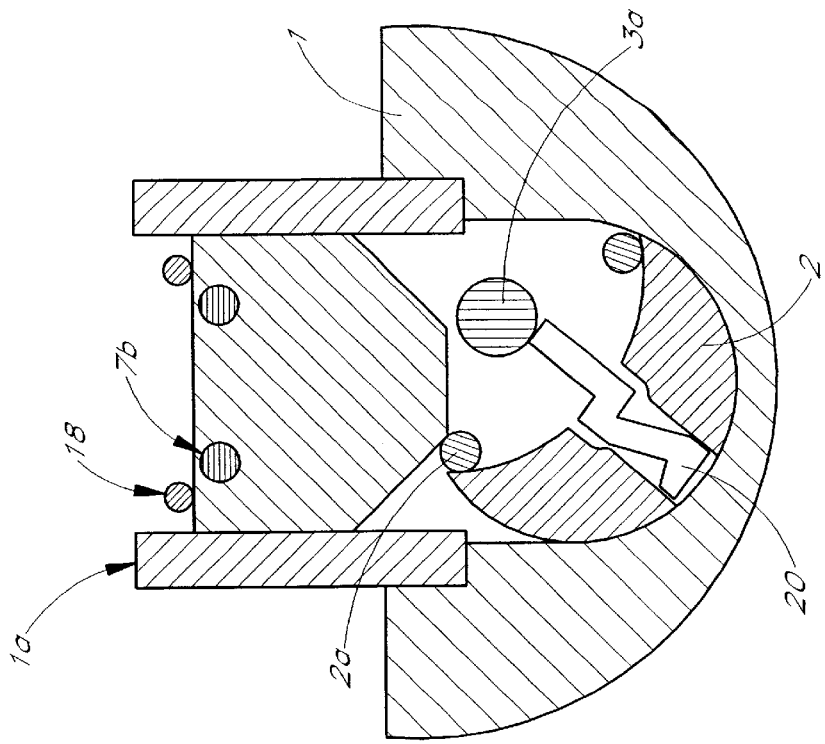
Figure 7B:
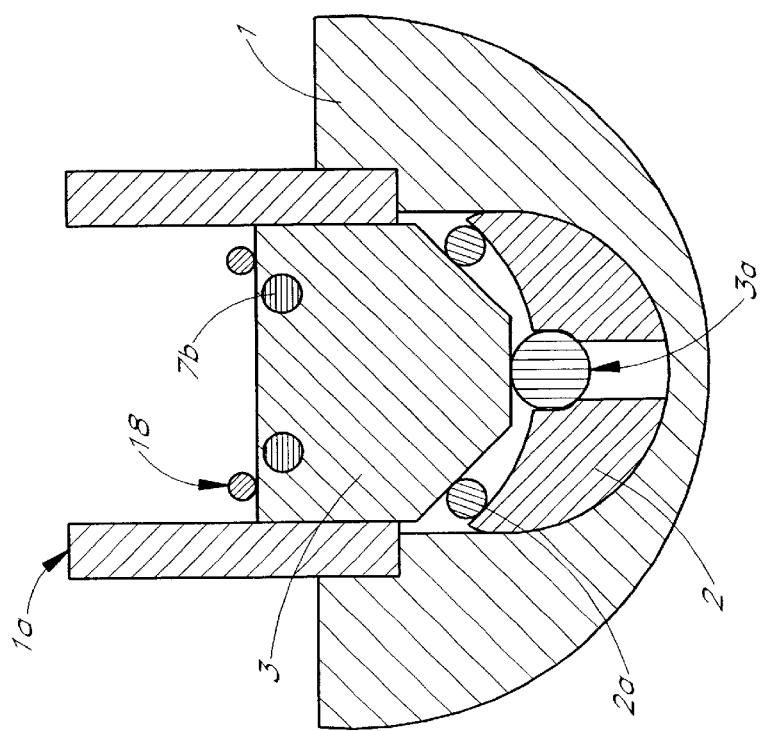

FIGS. 7a and 7b each show a sectional cutaway view from the front of the lock of FIG. 6 in different use configurations, without and with a key, respectively, all in accordance with the teachings of the sent invention.

Figure 8A:
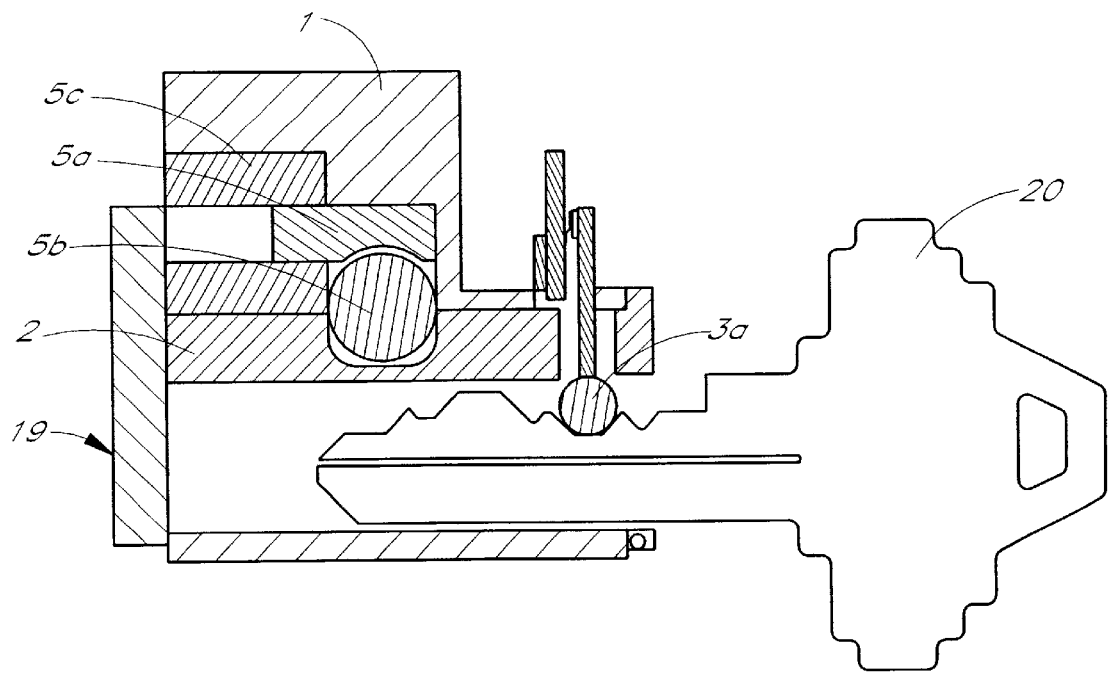
Figure 8B:
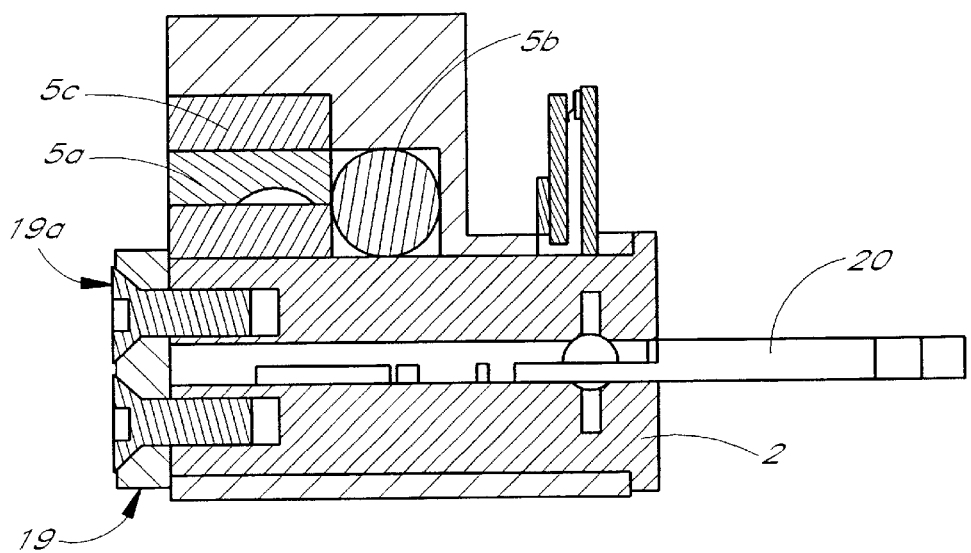

FIGS. 8a and 8b each show a sectional cutaway view from the side of the lock of FIG. 6 in different use configurations with a key, all in accordance with the teachings of the present invention.

Figure 9:
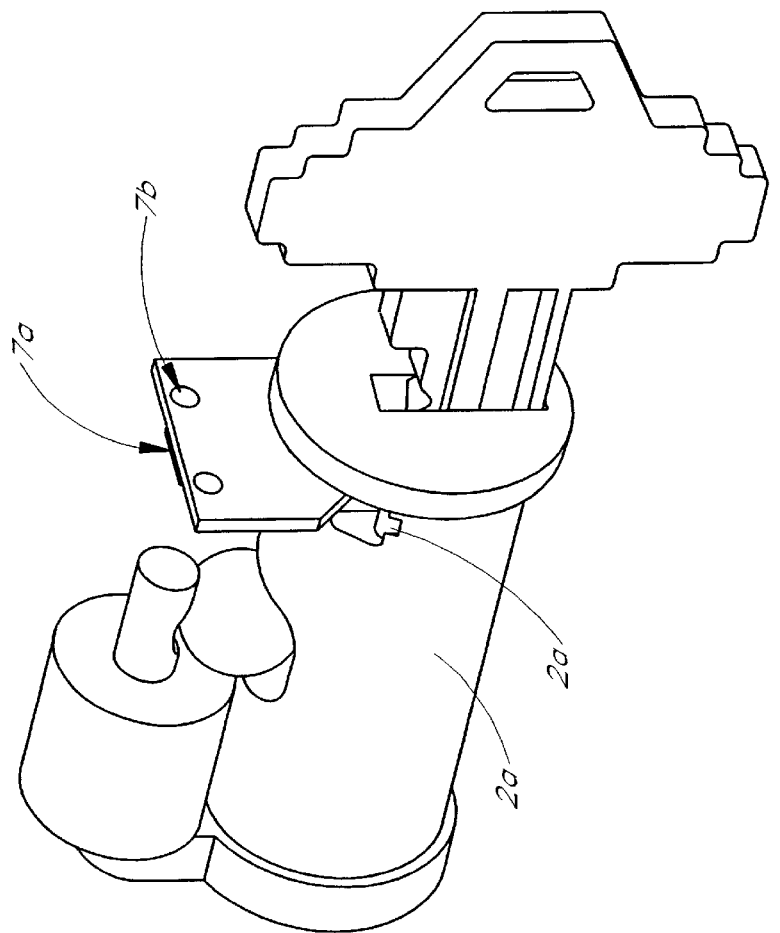

FIG. 9 shows a detail projection of some of the components of the lock of FIG. 6 with a key, in accordance with the teachings of the present invention.

Figure 10:
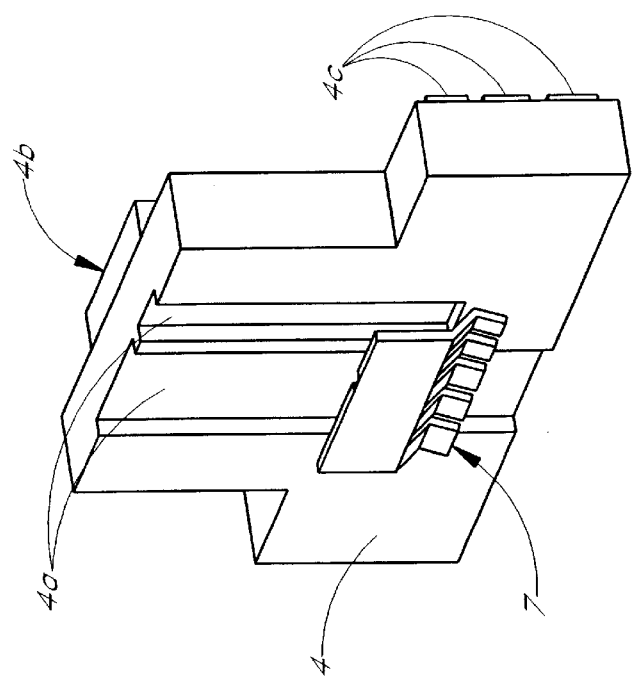

FIG. 10 shows a detail and relatively enlarged projection of some of the sensor and electronic mounting components of the lock of FIG. 6, in accordance with the teachings of the present invention.

FIGS. 11a–c shows sections of a capacitive sensor array and holding brake mechanism, where 11a is perpendicular to the keyway from the front, 11b is through the keyway from the top, and 11c is in the plane of the circuit board, all in accordance with the teachings of the present invention.

Figure 12A:
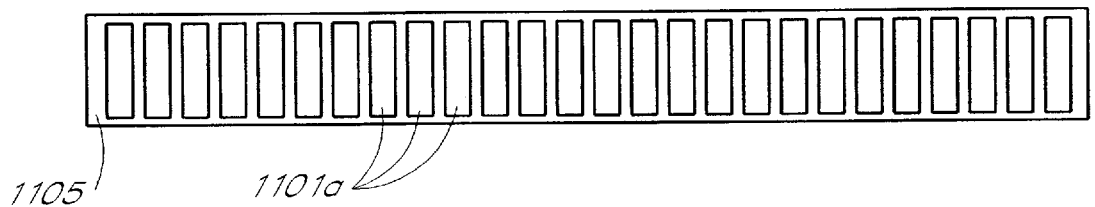
Figure 12B:
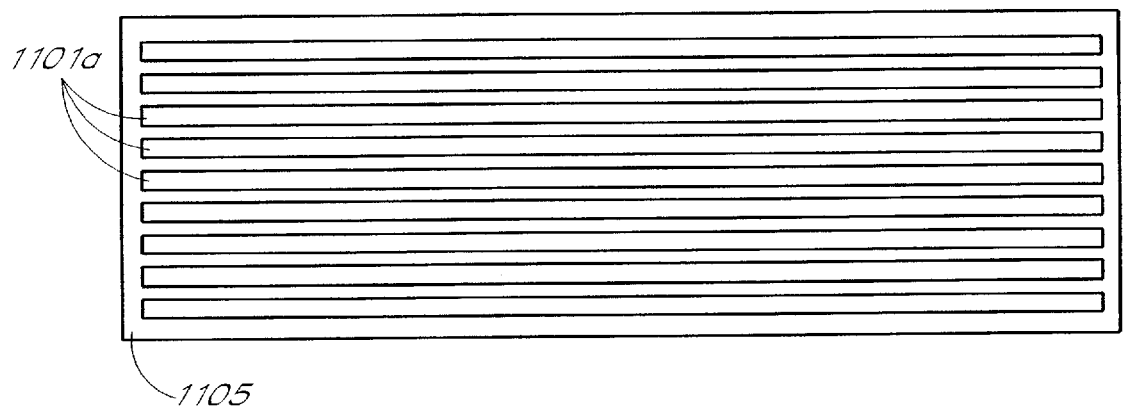
Figure 12C:
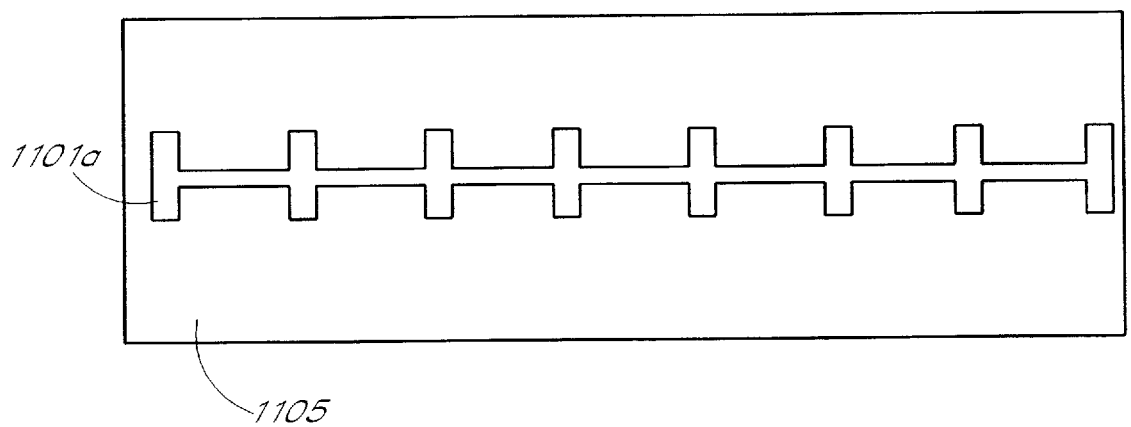

FIGS. 12a–c show alternate configurations in plan view of capacitive sensor arrays for the lock of FIG. 11, accordance with the teachings of the present invention.

FIGS. 13a–d shows the same sectional view of an actuator mechanism in various configurations of use, in accordance with the teachings of the present invention.

Figure 14:
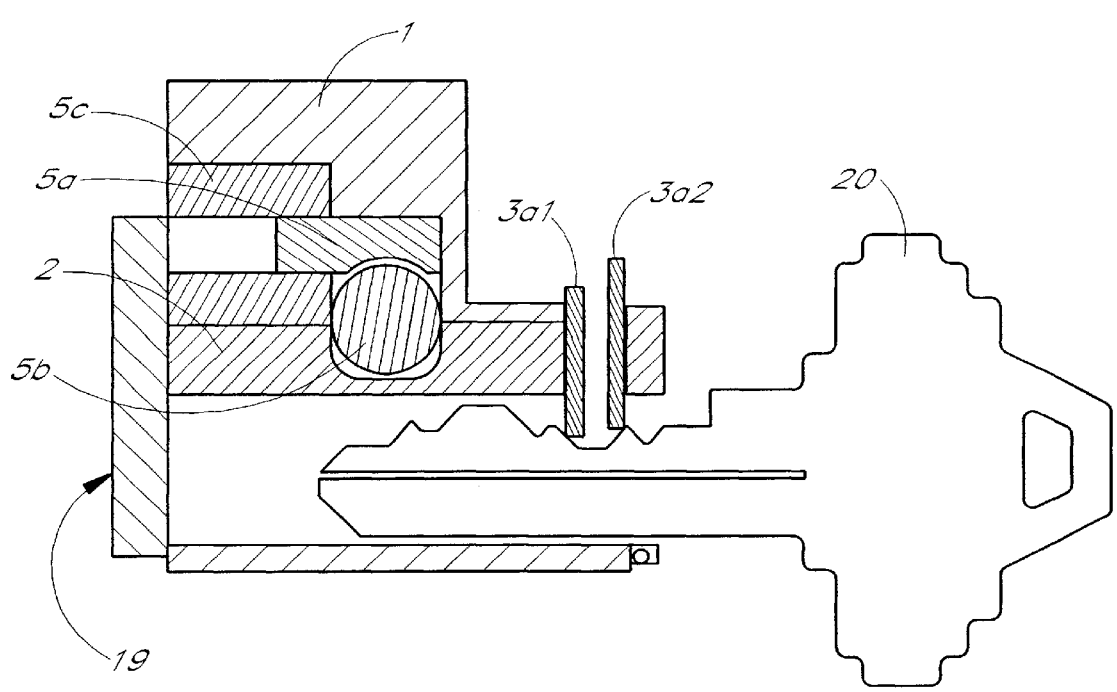

FIG. 14 shows a sectional view parallel with and through the keyway of an exemplary embodiment with two styluses in accordance with the teachings of the present invention.

FIG. 15a shows a section perpendicular to the keyway and through a sliding plate of special shape and using a cantilever sensor in accordance with the teachings of the present invention.

FIG. 15b shows a detail plan view of a cantilever sensor from FIG. 15a, in accordance with the teachings of the present invention.

FIGS. 16a–c shows sections of an inductive sensor array, where 11a is perpendicular to the keyway from the front, 11b is through the keyway from the top, and 11c is in the plane through the keyway form the side, all in accordance with the teachings of the present invention.

Figure 17A:
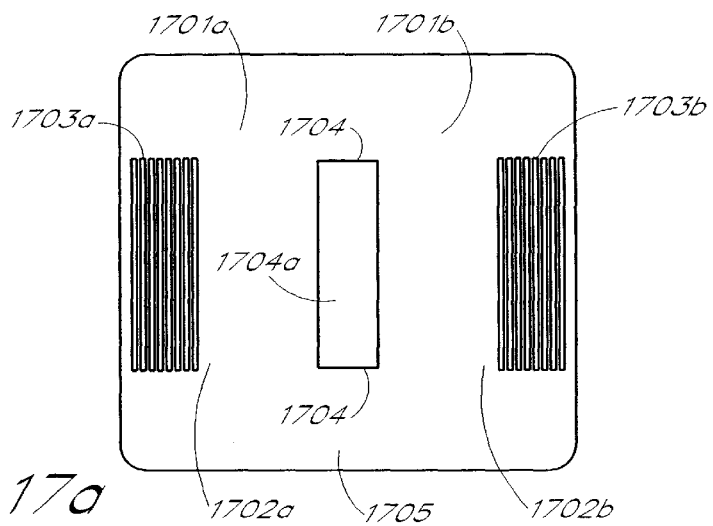
Figure 17B:
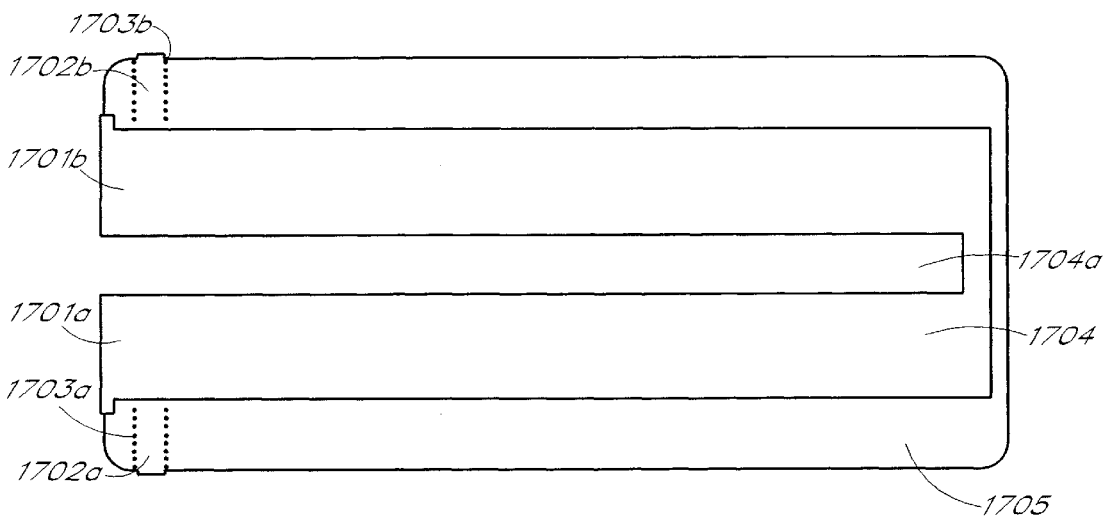
Figure 17C:
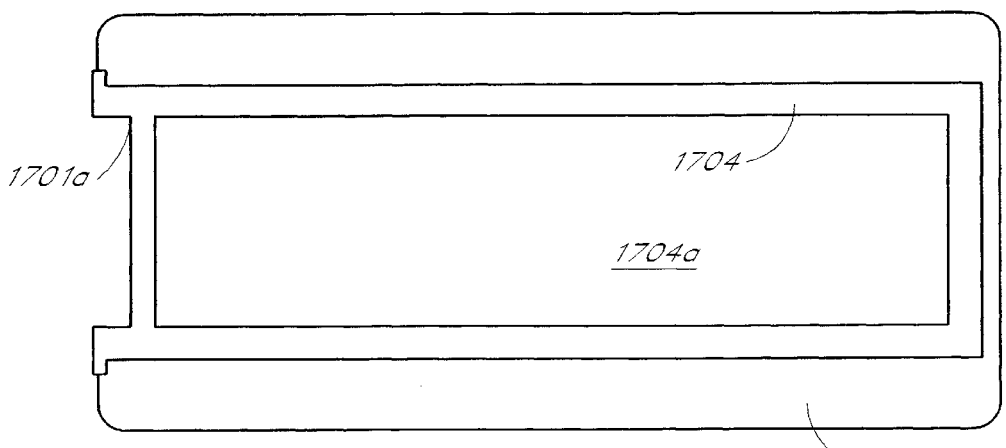

FIGS. 17a–c shows sections of an alternate inductive sensor, where 11a is perpendicular to the keyway from the front, 11b is through the keyway from the top, and 11c is in the plane through the keyway form the side, all in accordance with the teachings of the present invention.

Figure 18A:
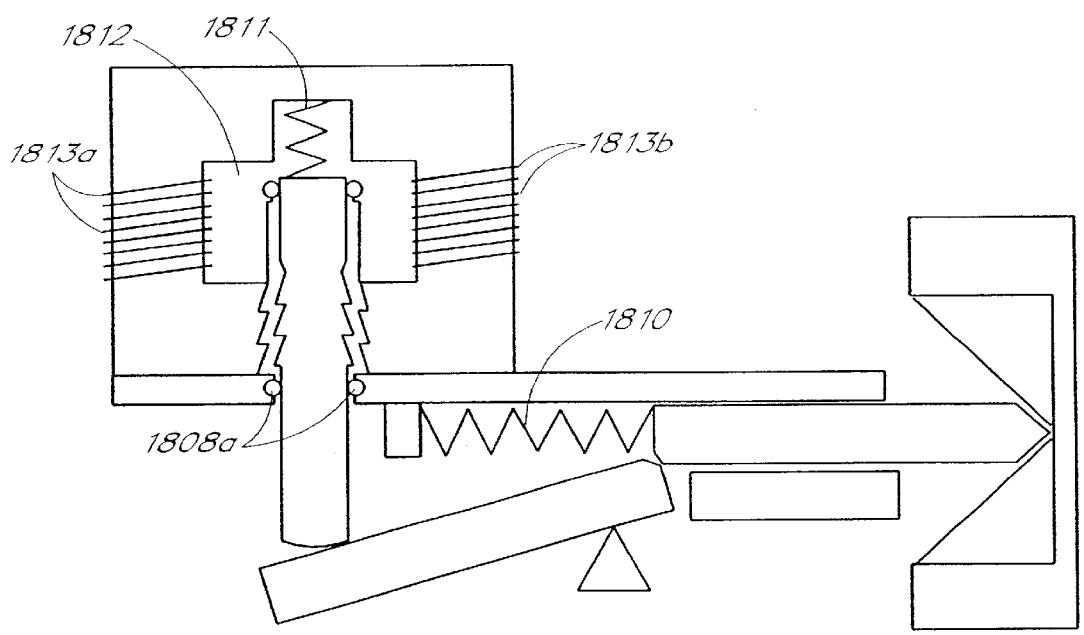
Figure 18B:
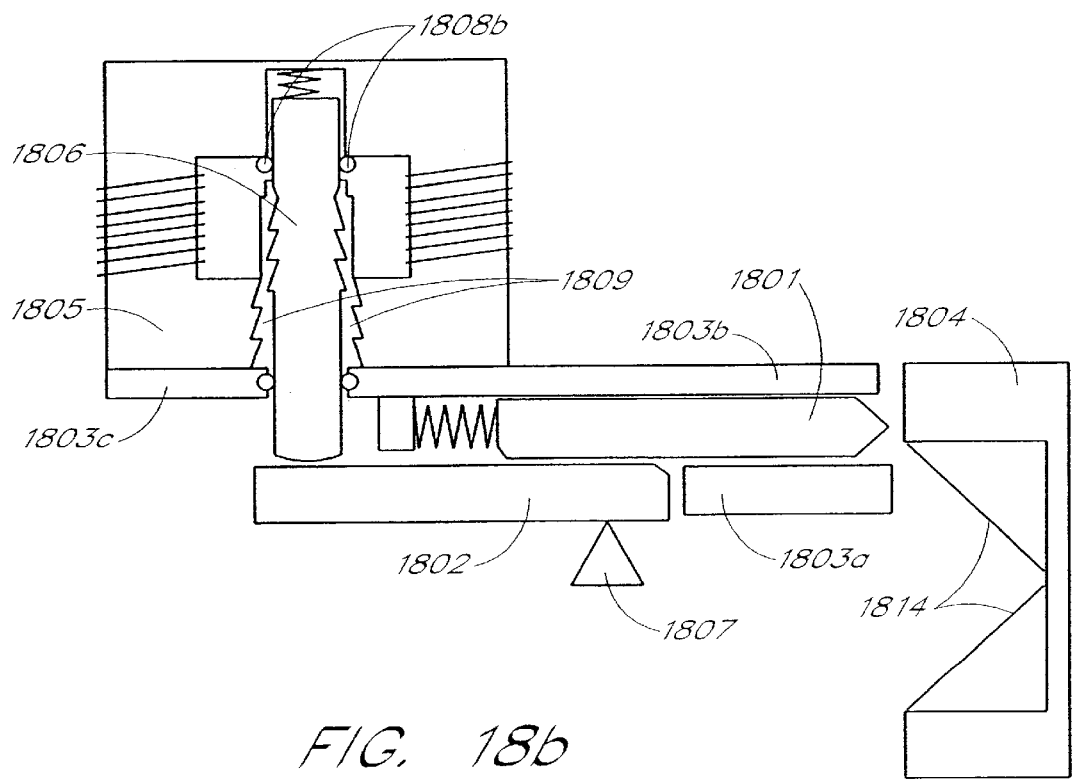

FIGS. 18a–b shows combination functional and sectional views of two use configurations of an exemplary actuator and latching mechanism in accordance with the teaching the present invention.

Figure 19:
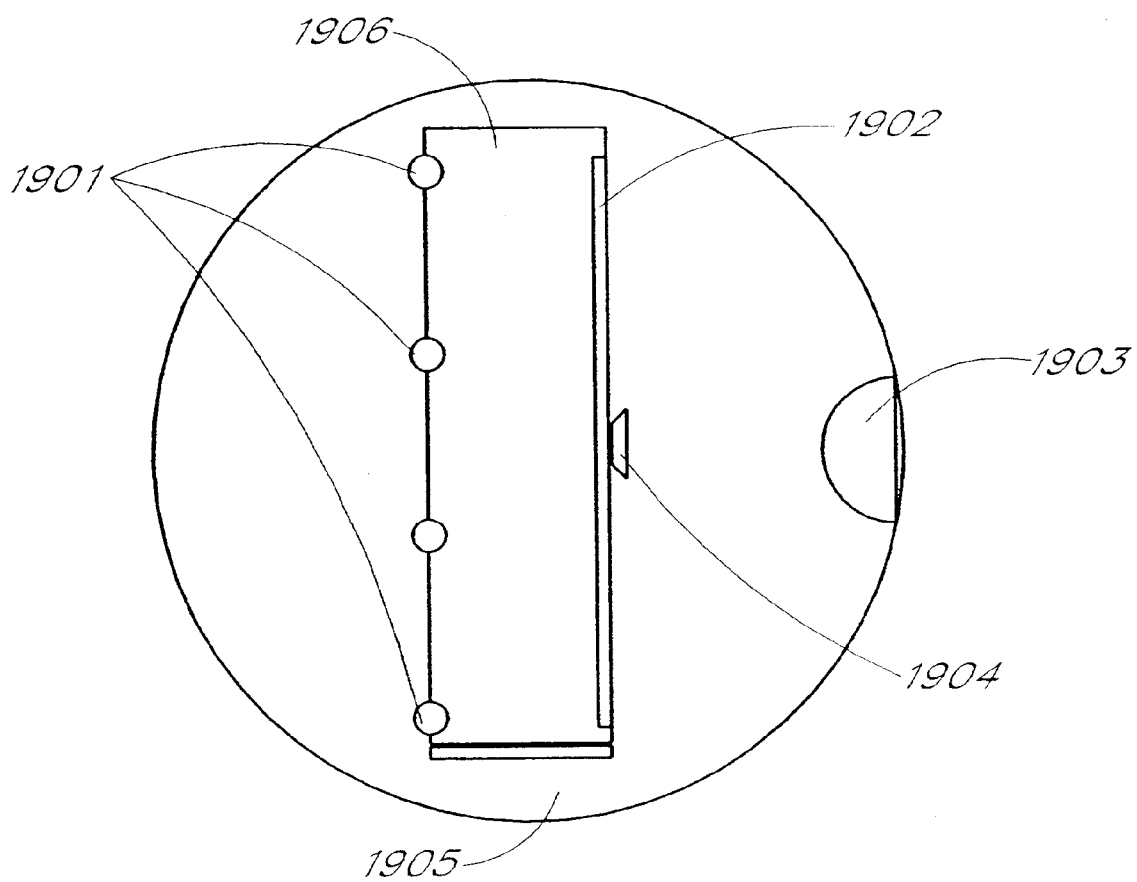

FIG. 19 shows a sectional view perpendicular to the keyway from the front of an exemplary optical sensor system in accordance with the teachings of the present invention.

BRIEF SUMMARY OF THE INVENTION

This section introduces the basic idea of the invention, but makes significant simplifications and omissions for clarity and should not be taken to limit its scope in any way; the next section presents a more general view.

A lock is disclosed that can be operated with a wide variety of existing metal keys. To be able to do this, it senses the key "bitting" profile (the part that encodes the secret key information) as the key is inserted into the lock. Before allowing unlocking, it must successfully match the profile pattern with one in its database of allowed key templates. The actual physical unlocking is by means of a miniature electromechanical actuator whose effect is amplified and strengthened by some preliminary rotation of the lock. Two types of exemplary embodiments are described, one with the electronic parts located outside the rotating plug and the other where they are contained wholly within it. Extensions allow the lock to learn new keys, read a key-blank series code in addition to the biting pattern, protect itself in case of attack, securely get its battery changed, be operated like a combination lock, and communicate with external devices or the person operating it.

Sensing the key bitting profile mechanically includes elements that are free to move perpendicular to the direction of insertion of the key into the "keyway" slot. These mechanical sensing members are urged by a spring toward the key bitting and track or follow along its profile as the key is inserted. The part of the sensing member that comes into contact with the key is a small stainless steel ball (about ⅛ inches in diameter), that is constrained to travel in a radial drill hole in the plug, but is free to rotate, and thus moves smoothly over the key surface. The other part of the mechanical sensing member is a stainless steel plate constrained to move perpendicularly to the key axis and in a plane perpendicular to that axis. The plate includes wiper arms that are electrically connected. They ride on two electrical contact tracks mounted in a plane parallel to the plate. One track is resistive and the other conductive, and thus the resistance measured across the ends of the two tracks varies as the part of the key profile under the ball rises and falls. (The key profile can also be sensed by other mechanical or electromechanical means, such as capacitive, inductive, optical, or acoustic.

For processing, the key bitting pattern in its continues analog voltage form is converted to a digital form by, for instance, being sampled. The result is a series of biting height values, spaced over time. Existing metal keys are believed to have five to seven evenly-spaced pin height locations, each taking on between four and ten different values. (The remainder of the pattern is simply ramping that permits the key to be inserted and withdrawn, and because too sharp an angle does not work well, actually means that certain extreme transitions between adjacent heights are not used.) The quantization of the key information has to be adequate to recognize this pattern of heights. The number of samples per second must be adequate to accommodate the fastest insertion speed anticipated, believed to be roughly 50 milliseconds, which suggest a sample be taken every millisecond or so.

The pattern matching algorithm transforms the sampled waveform acquired into a feature set. Preprocessing isolates the bitting segment from the pre and post parts and attempts to correct for any physical key skew it can detect. Then the pattern is normalized to a standard length, involving linear inter-sample interpolation. Features are extracted, ignoring systematic differences, such as that a more rapid key insertion tends to have more "bounce" in a mechanical sensor, which produces a slightly different pattern shape. Such feature sets can then simply be compared to templates based on previous pattern sets. There is a match if the differences are systematic and within tolerances, as is well known in the pattern matching art.

The physical unlocking is allowed when an appropriate key match is detected and logic circuits then provide electrical energy to allow unlocking. Most of the energy for the unlocking is provided by the person operating the lock, who turns the key through a preliminary angle, during which elements are configured to either prevent further rotation, or to allow it and consequently full unlocking. A solenoid can be energized to move an obstructing plunger, which would otherwise block a stainless steel ball straddling the plug/body shear line from being able to be cammed out of the shear line and permitting complete rotation of the plug. Some other actuators unlatch by energizing a holding magnet while elements are moved so that a particular configuration is achieved, thereby allowing unlatching.

The embodiment where the electronics is believed small enough to fit completely within a standard half-inch plug differs in some aspects, and these are presented next and before the general features that apply to both embodiments.

All three major silicon parts could be on a single chip: (a) sensors that detect the motion of the pin riding on the key profile; (b) standard control parts, such as analog to digital converter, lock logic and rule bases; and (c) all non-purely mechanical parts of the locking actuator.

In one sensor embodiment, the spring-loaded element that tracks the key profile is coupled to a magnet. As it moves up and down, its magnetic field moves along a detector on part of the chip which is mounted in a plane parallel or perpendicular with the line of the magnet's motion. This yields a time-varying signal proportional to the height of the magnet and the key profile it is following. In one alternate embodiment, the distance from stationary plates to key metal is measured directly by measuring small changes in capacitance. Such plates can measure the key as it is inserted, also yielding time-varying height readings, or an array of them can measure its shape while stationary after insertion. In another alternate embodiment, it is measured by changes in AC inductance.

When the actuator is in the locked state, micro cantilevers protrude from the surface of their part of the chip, into mating cavities in a plate pressed against the chip surface or a another silicon structure integrated in a way that it can slide within the first. The mating of the cantilevers into the cavities prevents the plate from being able to slide in at least one direction over the surface of the chip, as it essentially tries to shear each cantilever off by compressing it towards its attached end. During unlocking, however, the plate is freed to slide by the pulling of the micro-structures back behind the front surface of the chip. This pulling-back motion can be caused, for instance, by electrostatic force between the overhang and the base it hangs over, by piezoelectric effects induced in layers of the cantilevers, or by electrically heating cantilevers laminated of materials with different coefficients of expansion or shape memory alloy.

The result is that the plate slides responsive to a spring pressure applied to it, and thereby brings its own series of parallel slots into alignment with blades that become spring-biased to penetrate through it and substantially further. The single solid base of the blades is then moved out of the way of a conventional sidebar, which cams into the plug as it is further rotated. As the plug is rotated, first a small stainless steel ball is cammed into the plug, which induces the first force. Then a second ball is cammed in that induces the second force. And finally the sidebar attempts to penetrate the recess left by the blade base when the blades have successfully penetrated the plate. During the cycle of return to locking, the sidebar is retracted first, then the ball that moves the blade base enters its recess in the body, and thus the blades are pulled out of the slots first by their counter spring. After this, the ball that pushed the plate is moved into its recess in the body, and this lets the plate's counter spring push it back to its locked position.

As will be appreciated, some embodiments split and/or duplicate functions between the rotating part, the fixed part, and any remote part.

Some general features that apply to various preferred embodiments mentioned above are now described.

New keys can be learned by the lock simply developing a template for them and recording this in its memory. It might be done, for instance, when a currently valid or special key is used just before or after the new key.

Locksmiths and many larger organizations are believed generally to desire their own unique key series and often wish to use standard key cutting equipment to customize the special blanks. The lock can be configured to read a keyblank series code in addition to the normal bitting. For instance, this can be achieved without additional sensors, simply by creating a pattern of extra shapes of the bitting part of key blanks read by a specialty formed stylus or by inclusions of material read by material specific sensors.

The lock knows when invalid keys are inserted. Attempts to try many keys to find a valid one will thus be recognized and the lock can then delay its operation for a fixed amount of time, say, three minutes. The time period and other parameters can also be adjusted if the attacks continue.

Provision may be needed for batteries to be replaced, and this might be most conveniently done from the front of the lock, but means can be provided such to prevent vandals from being able to remove batteries when the lock is locked.

Any unauthorized key could be used to enter a PIN code. For instance, code 7294 would be entered by trying to turn seven times to the right, then two to the left, nine right, and four left. Once the lock recognizes the code, the key can be used to throw the bolt and gain entry or to allow changing the lock's memory.

The lock can communicate with the outside world. It can talk with the user by lights or sounds to indicate various states. It might also simply not unlock the first time, such as to indicate that the battery is low and needs replacing. The lock could communicate with other equipment via galvanic electrical contacts or through so-called "contactless" infrared or radio frequency (many of which could supply power in case of battery failure). It could communicate with a building access control system or other network, for instance, or with various portable electronic devices.

GENERAL DESCRIPTION

The following description of possible embodiments is comprised of three sections: one addressing the logical or computational decision rules; a second considering what are in the preferred embodiments realized using electrical, electronic and transducer technologies; and the third addresses some mechanical aspects.

Logical/Computations

Here the various decision rules and record keeping aspects are addressed: how the decision to unlocking is arrived at; how this decision process may be changed in case the lock detects special circumstances; how the rules shaping the decision process may be changed; how sensor input may influence the decision process; and finally how the lock history may be maintained and this process itself modified.

Where or however the processing rules and record keeping are realized is not essential here and is also addressed elsewhere. Accordingly, "controller" will be used to refer the mechanism(s) that realize the logical functions described below.

When Does Unlocking Occur

At any given time, the controller has a stored set of keys and certain "rules" related to them. The lock may not be able too meaningfully unlock (and will be said to not be "ready") in certain circumstances, such as for example, when it is in an unlocked position, when unlocking has been "blocked" (as defined elsewhere), or possibly when in the middle of certain "multi-key" operations.

There may be one or more keys whose rules allow them to work "directly," in that when the lock is ready, and the key is recognized, the lock is able to be opened. Other keys may be treated substantially as direct, but subject to restrictions, including for example: keys that can only be used to unlock the lock a fixed number of times (such as "one-time" keys or "two-time" use, called "count-restricted" keys); keys subject to restrictions on the time of day and/or day of week, etc. called "time-restricted" (implying the inclusion of a real-time clock, which may also allow operating with any key during preset hours); or the same key may be required to be recognized multiple times, and possibly separated by time intervals in a range determined by the rule.

Rules may involve more than one key. Two different keys may be required to be recognized within a limited time interval, implementing so called "two-man rule" or safedeposit box type applications. More than two keys could be required, and the order in which they are inserted might or might not be restricted. Another example of multi-key rules requires a special key, the "guard" key, to be inserted to make certain other keys operable, and then when the guard key is inserted again, those keys are not allowed until the guard key is inserted yet again. Naturally, this could be extended to a "guard-day" key that would enable unlocking and a "guard-night" key that would disable it.

Furthermore, some keys may be used simply to create logging, such as for the familiar time-clock or watchman type of functions.

It should be noted in general that a security mechanism should guard potentially confidential information against all known credible attacks. In the case of the decision to unlock, the amount of time, the amount of power, or the emanations from the process of making this decision should preferably not leak information. One kind of information is the well known degree of partial correctness of a key, such as would be revealed when the checking is aborted during the sequence of feature checking at the first feature that does not match. Others kinds of partial information might be that certain keys are in the rule base or that certain types of rules are present. Timing, power-consumption, and/or eminations should be constant or at least not readily reveal such information.

Defensive Measures

When the lock notices keys that are unrecognized (or possibly disallowed by rules) being inserted, it may take defensive measures. A possible reason for such measures is that an attempt may be in progress to exhaustively search for an operable key or test improperly obtained keys.

An example measure is simply that after a certain number of false attempts without any intervening successful unlocking, the rule base is changed. It might then, for instance: not allow any further unlocking; require two-man rule; disable some keys in combination with possibly enabling special other keys; or change the matching criteria.

Such changes in rule base could then be reversed or otherwise compensated for, once the appropriate key(s) are used.

Another example is that the lock would refuse to operate (i.e. become "blocked") temporarily. This could be realized by simply enforcing a fixed delay. The delay could escalate if the improper keys continue to be used. Other parameters, such as the number of times that a correct key (or combination) must be entered could be increased.

How Keys are Introduced Into the Rule Base

There are a variety of ways that keys could be introduced into the rule base, or have their rules changed.

A new lock could have certain keys programmed at the factory, that could then be used by the end user in certain circumstances. For instance, the code could be communicated by the user and/or the manufacturer to someone who needs to gain access but where transfer of a physical key is less desirable. This could be in an emergency situation, or when something unexpected happens, such as the owner gets locked out or a sudden visit or urgent repair. Another example is retrofit of existing locks, where the physical keys used for them have currently valid key. The ability of keys in the rule base to allow this, and the resulting rules and algorithms for the new keys and possibly other changes to the rule base are also possible. For instance, there might only be one valid key at a time, and introducing a new key would enable it fully and lock out the old key completely. Another boundary case is that the only change in the rule base is to add the new key in with the same rules as the old key. Yet another simple case is that the authorizing key is only a one-time or otherwise count-restricted key. The authorized key may be time-restricted and its authorization may last only until any other authorization with a different authorization key.

An illustrative example application is a hotel. Upon check-in, a guest receives a one-time-use temporary key. Then the guest can use the one-time key to authorize his/her own, say, car or home key, and discard the then useless one-time key. If the guest will not be using his/her own key, then a different temporary key with time restrictions but no new-key capability could be issued. Or the temporary key could be allowed to either operate as the key or to introduce a new key at any point, all within the time or next-guest restrictions. There is might also be housekeeping keys (possibly part of a master key hierarchy or other structure) that lock guests out during cleaning. If the hotel wishes to introduce a restriction on the number of simultaneously useable keys, then this could be enforced by the rule for the number of keys enabled, possibly counting the use of the temporary key if it is allowed and/or used. Special keys could be issued for one-time use if the guest has left his/her key in the room. Or a key might disable the room temporarily, because the guest credit line has been used up. Or the room might be put in a cleaned and ready state, after which only the new guest(s) could enter.

If physical keys are to be re-used, such as when a hotel guest checks out, then it may be desirable to prevent a recently used key (or key information) from being allowed to be used immediately or continually. For instance, keys may be drawn from a basket of keys at the front desk and given to new guests, who can then open any ready room. To prevent a guest, or someone who obtains the guest's discarded key, from using it to enter other ready rooms, these keys should be blacklisted from being allowed to open rooms subsequently left ready. The keys that can be put on the list that opens ready rooms can be read each evening from inventory and placed in the basket for use that day or different color key groups can be used each day.

Unfortunately, it is believed that someone given a key that opens any ready room can visit more than one such room before other guests do. In one approach, the other guests will go back to the reception to report that they were unable to enter and then the key used and timing can always be identified from the lock's log. In another approach, where guests may be allowed to inspect more than one room before deciding, the key can work in all cleaned rooms until, for instance, the temporary key is replaced.

Similar uses could apply to rental vehicles, shared vehicle fleets, compartments on boats and trains, public lockers, safe deposit boxes, offices, rest and dressing rooms, shared facilities in housing/office complexes, timeshares, etc.

Of course multi-key sequences could be used instead of single keys in the foregoing, and the valid key(s) might be required to be inserted before, after, or before and after the new key(s).

If the lock is able to communicate with an outside entity, then that entity might supply new keys or rule changes to the lock. If the rule base or unlock decisions are made remotely, then much of the forgoing could be applied and/or simplified. But other input could also cause changes in the key and/or rule base. For instance, the guest could insert the key at check-in and thus obviate the need for a temporary key. When someone must be crossed off the list, this could be done from the central site.

The addition of a new key to the rule base might be conditioned on other requirements. Some of the requirements are of the type already considered, such as time of day, day of year, etc.

Sensor Input

All of the forgoing might be influenced by another type of input, related to physical operation/position/condition of the lock and/or associated apparatus. Some sort of sensor is believed to be needed for this. For instance, the lock might sense things such as its angle of physical rotation by the key or the rotational and/or torque inputting of a PIN code. A torque could indicate someone trying to operate the lock. Sensor input might also provide indication of whether a door, for instance, is open or closed. Emergency situations, such as rapidly-rising, or simply high, temperature might be a basis for unlocking. Presence of a key might also be required to prevent defensive measures.

Example uses include only being able to add new keys when the lock is in a certain rotational position, or simply in the unlocked state. Or there might be a sequence of states required to interact with the key(s) used to authorize and the new key(s). For instance, the old key might have to be used to unlock the lock, and the new key inserted shortly thereafter, when the lock is in the unlocked position.

Logging

A control unit could keep a log of events that have happened. Everything that might be of later interest could be recorded and only discarded as the storage needs to be reclaimed for other uses. What is recorded might also be more selective, such as only certain keys, or uses within certain times, and/or only certain types of events, such as false attempts, rule changes, log reading, etc. The algorithm for purging or recycling storage might have priority or summary data last longer than some details and might also enforce time limits on the maintenance of some data.

Under what circumstances logging information is revealed by the lock, and what is information is revealed could be the subject of a logging rule base. For instance, certain keys, such as a guard key, might always be provided an indication of certain counts since the last guard key, such as improper key attempts and/or number of openings, particularly if such number are out of bounds. Privacy and/or "fifth amendment" type of considerations may require that logging, if kept on certain keys, can only be accessed with those keys, and/or possibly under some onerous combinations of other keys. Of course if there is communication to the logging rule base, it could implement all the familiar access control and query restriction types of provisions known in the computer art. Such restrictions could also include presence of physical keys.

Electro-mechanical

This section addresses the electromechanical aspects of the preferred embodiments. In particular, it comprises several aspects: sensor and actuator transducers, input and output with the operator, communication with electronic keys, and the storage as well as possible generation of power.

Sensor Technology

The recognition of mechanical keys can be accomplished in a number of ways. One way, that receives the most attention here because it is believed to be preferred is by the so called "bitting" pattern or coded depths typically cut into standard key blanks to form the vast majority of mechanical keys. Other know geometric key information could also be read.

Other recognition techniques can be applied, separately or in combination. For instance, certain properties of the metal that coins are made from are read using known techniques by coin mechanisms typically used in vending machines. The so-called "profile" of the key, which mates with the broached shape or "warding" visible on the front of most locks is another possibility. It could, for instance, be measured by known electronic ranging techniques, or by feelers. A signature could be taken from the physical key by introducing energy into it and measuring its resonance's and/or various time-domain characteristics. The reflective visible color or image of the key could also be read.

Although any of these techniques could be equally applicable to the present invention, for concreteness and clarity, only a few alternate preferred embodiments will be described in more detail.

One embodiment, "dynamic," measures the "bitting" pattern of the key, the cut edge visible from the side, as it is inserted into the lock and/or withdrawn. An alternative "static" embodiment uses sensors to read the bitting pattern directly, once the key is fully inserted. Various sensor technologies can be used for each approach, such as by use of a digital camera, array of light/infra-red sources and/or sensors, the reflection patterns of other energy directed at the key, other metal detection sensor techniques, or any other sensor technology that may already be or become known in the art.

Physical contact of an element with the key is believed to have some advantages with respect to ability to deal with dirt, water or other contamination of the keyway. One preferred embodiment described later uses a potentiometer whose wiper is physically moved responsive to physical motion of elements tracing the key profile. Another sensor technology also described in detail later is capacitive proximity sensing, which can be used to sense the bitting as the key is inserted. Yet another is inductive sensing.

Whatever "dynamic" sensing technique, whether stylus or electromagnetic/accoustical sensing, plural sensors may have advantages. In one alternate embodiment detailed, two active styluses are used, yielding additional information or facilitating measurement. More than two sensors, such as three or four, may provide additional information and/or redundancy useful in canceling the effects of noise, single sensor failures, etc. A sensor measuring axial insertion depth of the key, for instance, allows the timing of samples to be normalized to correspond to equal increments of insertion.

It will be appreciated that copies of metal keys are often made and that sensor techniques might recognize such keys as the same or as different. Recognizing the differences, might be as simple as measuring a parameter of the type of metal, which would distinguish many types of copies. It might even go as far a taking a signature of the whole key, such as be determining its resonant frequency. Such techniques might not be needed if the key series techniques are applied or other techniques yielding significant control over duplication of keys. In fact, some effort might be needed to reliably accept ordinary duplicates.

A passive array of sensors is exemplified by a capacitive distance sensors, to be shown in more detail, that measure the distance to various points along the bitting pattern of the key after it is fully inserted.

It is well known in the art that velocity or acceleration or position change sensors could also be adapted instead or sensors that read position or distance directly.

There is a wide range of sensor technology, including that which relies on changes in inductive, resistive, magnetic, static electric, and acoustic parameters, as examples. In the not unrelated area of phonograph record pickups, for instance, there have been a number of approaches that could all be adapted to measuring the key profile. The "crystal" and "ceramic" approaches rely on changes in deformed materials of piezoelectric and electrostrictive effects, respectively. The "magnetic" and "dynamic" pickups use magnet fields from permanent magnets that pass through coils. Other types have been used, such as so called "condenser" and "electronic".

Actuator

The actuator function merely translates electrical or whatever logical signal into the ability of mechanical motion, and any suitable means or method for accomplishing this may be called an "actuator" here. This can be realized in a variety of ways, three of which are given as examples in preferred embodiments and two of these are elaborated on here. First some alternate example approaches are highlighted.

Piezoelectric elements can act as a brake that is released only when the appropriate electrical signal is applied. Another approach allows a very small permanent magnet on needle bearings to be rotated, if it is not, the sidebar via a spring cams an element that must shear it to move further, which element in turn allows further motion of the sidebar.

Users may wish to torque while the lock decides and unlocks (until they learn the timing of the lock or are alerted by some kind of noise or other indicatation). A way to obtain this is to give the torque a very low mechanical advantage over a self-moving latch, such as motor or solenoid, and provide a slip-by clutch in case of over-torque (but ensure that overtorquing does not allow unlocking). A miniature dc motor, like in at least some small electronic watches, would be the self-moving part. The mechanical advantage could be provided by in effect turning the hands of a watch or moving the end of a series of levers, in which the short parts drive the long parts.

Consider now an embodiment detailed later comprising a holding magnet that is pulled away from a magnetic element by the initial rotation: if it is energized during this period, it brings the elements with it, otherwise not. It is believed that a holding magnet can result in a more efficient latch than a motor or solenoid. Plural elements are used, each of which is designed to go with the holding magnet or with the separating force. This means that a random shock is unlikely to put the elements in the right places.

Considering now the micro actuator approach already mentioned and described in detail later, several factors should be noted.

Precision alignment is believed to increase the difficulty of manufacturing in general, and the micro actuator assembly in particular. The need for precise mutual registration of the patterns on the plate and silicon can be avoided by a randomization approach. Instead of arranging the cantilevers and cavities in regular rows and columns, one or both of them could be arranged in a seemingly unstructured or "random" pattern; all the individual cantilevers and cavities would, however, be oriented in the same way, say all the attached ends facing north and cavity business edges facing south. When locked, some cantilevers will not line up with any cavity, and will thus be pushed back into the retracted position by the plate, and will thus not contribute to preventing the plate from sliding when invalid keys are tried. There will, however, be many others that will prevent operation of the lock without agreement of the lock logic.

A potential problem is that the plate may stop some protruding cantilevers from being able to retract, by "jamming" its business end against the cantilever's free end. One way to reduce this is simply by shaping the cantilever ends or plate surfaces with a little relief, so that if the lever can get past the plate in a given position, then it will not be in contact with it further. An approach that is believed preferable is for the plate to move a small distance in the opposite direction during unlocking. In other words, the plate moves a small distance in the direction from the attached ends to the free ends, while the force is being applied to retract the cantilevers just before plate is attempted to be moved its full distance in the direction from the free ends to the attached ends. It is believed this solves the problem, since any jammed cantilever will be released while the retraction force is applied.

Power could be saved if the cantilevers can be returned to the locked state immediately after the plate has slid over them. It is believed possible for the plate to push them back in during locking simply because its edges traverse each cantilever from its attached end to its free end, instead of from the free end toward the attached ends, as in unlocking. Power consumption could be further reduced substantially if motion or position sensors, potentially also integrated in the silicon, detect movement of the plate or those elements that will move it, in time to retract the cantilevers before the business edges of the micro cavities have a chance to actually engage them. This could even be by the cantilevers themselves. If the force of retraction is strong enough to operate when the plate is pushing on them, then there is no need to optimize timing and also turning can be started even before the lock logic has decided whether or not to unlock. Super low-power monitoring for motion during standby should be possible with known techniques, but could always at least be achieved by micro magnetic switches.

As will be appreciated, the number of levels of indirection from the micro-actuator mechanism itself, in this embodiment the cantilever and plate, to the actual outside world force applied through the keyway, can be varied. At zero, there are no intervening elements, and the plate would directly be cammed by the lock body. With a single level, exactly one additional element tests the plate. Two levels are described in the preferred embodiment for the micro-actuator. As would be readily appreciated by someone skilled in the mechanical design art, any number of levels of indirection could be applied to any of the example mechanisms described here, without departing from the spirit and scope of the present invention.

How It Talks With You

It may be desired for the lock to communicate with the person operating it, the communication being either in one or the other direction, or possibly in both. First communication from the lock to the person is considered.

One way for the lock to communicate with the person holding a valid key is simply to not unlock each time. For instance, the lock might only unlock every other time the key is used. Or it might only unlock if the key is inserted, withdrawn, and re-inserted in rapid succession. More generally, any sort of rules could be enforced that make the lock not open some times and thereby reveal that at least one such rule, if not exactly which rule, is enforced. Example uses of this approach would be that when the lock is running low on battery power this behavior starts, and gets worse as power diminishes. Another would be to indicate some property of the log base, such as that some sort of attack has been detected or that a change in the rule base has occurred.

A variation on this approach might be that the lock holds the key inside longer than it would normally, in those embodiments so equipped.

A wholly different approach for the lock to communicate to the outside world would be by making a noise or vibration Another would be to display something on an LED or LCD or other type of electronic indicator or display means.

The user could communicate to the lock either through a mechanical key or by general mechanical, audible, or visual means. For instance, special keys might send special messages to the lock. Their might be buttons, the user might be able to speak to the lock (as silicon technology advances) and the lock might even have a look at the person. The audio or video person recognition might be used in place of or to augment the authentication provided by the physical key.

The lock could be configured to communicate with another device for auxiliary functions. One example is a dry contact provided that activates a door announcer, lighting, or access control system. Another would be a serial link that communicates with all manner of "smart building" techniques. More generally, the lock could communicate with and/or control any sort of portable and/or fixed external system, such as might be used to control functions in a building, communicate with persons, facilitate external monitoring and/or record-keeping. Examples include personal digital assistants, cellular telephones, ets.

Power Source(s)

The control unit and sensors and actuator it is believed with today's technology need a source of electrical power. This could be provided by a battery. It could also be provided externally and/or through a special key—which would be important in case of lockout due to dead battery—or the lock could even generate power itself. With such additional sources of power, it makes sense that the lock could at least attempt to store surplus power for later use. Thus, a rechargeable battery or capacitor could be re-charged as far as possible whenever connected to an external device or when power is generated. Also, shorter-term storage of power could be used, such as capacitors, from one opening to the next, or to accumulate power fed in gradually such as from a solar cell.

The lock could generate power in a variety of ways. One is that the motion of the sensing elements riding on the key profile in the preferred embodiment might be used to generate electric power. For instance, so called "LVT" magnetic sensors are said to be "self-powering" and generate power that could, it is believed, be used to some advantage. Also axial mechanical forces from key insertion could be used. Another approach would generate power from the rotary motion induced by the key being turned in normal locking and unlocking. Well known rotary generators could be employed for this purpose. Solar power generation is know and used today. Other general approaches, such as due to thermal or electromagnetic energy fluctuations might become practical in future.

Generated energy could be used for various purposes. The lock could be made to be self-powered, not requiring any battery or external power. It could simply be made to try to keep its rechargeable battery adequately charged in normal operation. It could just accumulate a power reserve in case it should become disconnected from its remote site, and to reduce the instantaneous power requirements from the remote site. Another approach would be to say that when the battery has failed, the lock can still be operated, although it might take extra effort. One might have to insert and withdraw the key rapidly a number of times. This might overcome the lack of confidence in battery power that it is believed consumers may have to some extent, without requiring too efficient of a generator and power consumption.

Insertion Power-up

Power saving may be obtained by going into a "standby" low-power mode. One way to achieve this, called "switched off", is by means of an electrical circuit that is essentially open when no key is present and that is closed by the presence of a key. An example embodiment is simply an electromechanical switch that is tripped when the key is inserted and powers the whole device. Mechanical motion from the key could be transferred from the plug to the body, so that no power would need to be transferred to the key in this embodiment. Another type of switch would use the key as a conductor to connect two otherwise isolated contacts. An example of this would be two contacts that are urged in from the sides of the keyway towards its center but without touching. When a key is inserted, the two would be connected electrically and a latching circuit might be activated, and the two contacts could be pushed out of the way of the key against the rings just mentioned.

Other circuitry may be capable of maintaining the power once the switch is closed and/or substantially removing power once the control decides to do so.

Another way to achieve standby is to simply use the sensors. If they are self-powering, this could mean zero power. If they require power, then this could be brought down to a practical minimum.

Electronic Keys

A further means of communication between the lock and the outside world would be through a special sort of key. Such a key might connect by any of a variety of known means, such as galvanic, capacitive, inductive, radio frequency, or even acoustical or optical energy. It could provide power to the lock and/or the lock could provide power to it. The data communication could be only in one or the other direction, or it might be in both directions. A whole host of well known techniques are available for this.

The keys might range from a simple self-contained object that appears to users to be essentially no different than a mechanical key, all the way to a kind of transponder relay station, like a portable telephone, that establishes communication between the lock and some remote external device. An intermediate form would be a kind of PC key, that would allow software with graphic and possibly other interaction capability. An inductor used by the lock, such as for operating the latching mechanism or as a sensor, might double as part of the non-contact interface.

Certain keys may have access to a large number of locks and/or locks which should only be opened by that key under exceptional circumstances such as with police functions. In such cases, it might be advantageous for the key to limit the kinds or number of uses that can be made of it, such as limits on count or frequency of use. Similarly, a key might also provide its own log.

Mechanical

The mechanical aspects addressed here are: which elements are positioned in which parts of the mechanism, special mechanical keys; how the key may possibly be retained in the lock during rotation; non-rotating versions; detection of key insertion; and battery replacement.

What is Where

It is believed that there are four preferred basic configurations of where the electronics could be located relative to the mechanical. Two of these involve the sensors and actuators being located within the rotatable plug; two of them involve the sensors and actuators being located just outside of the plug m either the lock body or a "removeable core," such as those that have been made by Best Lock Company. Of course the approaches can be mixed. Locating everything in the plug allows retrofit to the maximum number of lock configurations. Locating everything outside the plug may mean more room to realize the needed components, making them potentially less expensive and batteries last longer. Interfacing to external devices can be affected: it is believed easier to interface the fixed part to a building and the rotatable part to a key inserted in it.

If there is an online connection, then all the analysis and control logic, log and rule bases could be at the remote location. The data from the sensor could be sent in raw analog form, or it could be conditioned and/or transformed in analog fashion, and/or quantized and possibly encoded at the lock location and sent in a digital form.

When there is no external connection, the analysis, logic, log and rule retention functions need be accomplished at the lock location. The sensor is believed to be located either in the rotating plug or in the fixed part that it rotates in. The actuator is similarly preferably in one or the other of these parts. It is believed preferable that they are located in the same part, thereby not requiring electrical signals to be communicated between the two parts and also allowing, in the manufacture, one part to be a simple mechanical part without electronics. If the two can be brought to the same part, then it is believed preferable that the other electronics and battery also be brought to that part for the same reasons.

Accordingly, there is a preferred embodiment for each of these two possibilities. But each of them has both an online and an off-line variation.

It should be noted that where an "electronic key" can interface by a so-called "non-contact" means, such as inductive or radio frequency, this interface could also be used for fixed on-line connection. In this case, for instance, a lock in a door could communicate with things located in other parts of the building, by a contact-less transciever mounted near the lock but on and/or in the door jam. This would remove the need to interface through the hinges or over a cable that flexes when the door is opened or closed. Of course, the online connection could in general be bi-directional, or be limited to one or the other single directions. Thus, for instance, a lock that can talk but not listen online could allow other is computers to keep the log information; one that can listen but not talk could receive requests for changes to the rule bases. Power might be supplied to varying degrees over such connections.

A burglar alarm or other "smart building" system may benefit from learning the status of the lock; for instance, a burglar alarm may simply arm or unarm itself when the lock is locked or unlocked, respectively. If the lock stops talking, the alarm system can assume it has been attacked or the door forcibly opened. Also, when the door is locked, the lock might send signals that cause the alarm system to be engaged; and when it is unlocked, the system might also be disengaged.

The sensor or actuator could be split across the boundary between the plug and fixed part of the lock. For instance, optical or magnetic sensors could be located in the fixed part, but recognize movement in the plug.

Of course, as would be obvious to one skilled in the art, many variations and combinations of these basic configurations could be made by moving some elements between positions. In particular, optional means for communication with the user, for instance could be located in a variety of physical positions, as would be obvious.

Special Non-electronic Keys

The mechanical keys used could be standard keys also used in other locks that are purely mechanical. This is believed to be part of the appeal of at least some embodiments of the present invention, as people would be able to use keys they already have to operate new things, and would thus be able to cut down on the number of keys they need to carry. Other keys could, however, be specific to this type of lock.

A one-time-use key, or limited-use key, could be made out of less durable material than conventional keys. They would not need to be as conmplexly shaped, since the key profile could be simply formed. They might, for instance, be NC stamped out of plastic or aluminum sheet. Laser cutting would also be possible from a variety of flat material stock.

The concept of a user-settable key is known in the lock art. One way to realize such a key within the present inventive concept would be a key that has pre-perforated and therefor frangible bitting elements, so that the user simply has to break off the right number of elements in each of several places to achieve the desired virtual bitting profile. Suitable fixtures or tools could be provided for this. Another approach would be to use set screws or other moveable elements that come up through the key to the bitting area, thus they would be standing straight up when inserted into a conventional lock configuration. They could have indicia for the rotational positions of the screws that would correspond to various bitting profile codes. Yet another approach would be detachable bitting elements, each having a different code, that could be attached to a key frame. Magnets could be detected by some sensors and could be attached and positioned by a variety of well known techniques.

Another embodiment of a mechanical key is one that does not include all the key information itself; at least part of the key information is supplied by the person operating the lock. As an example, the pattern of physical manipulation of a key in the keyway could impart key information from the person For instance, the key could be inserted to varying depths, each communicating a digit of a "PIN" code. The digits could be recognized simply because of a delay introduced at each position to be communicated or a change of direction or attempt to rotate the lock could be used to indicate the digits. A simple key for this purpose might have no key information and have ten discrete steps on its bitting, with visible indicia along its side so that the operator could see the digit corresponding to each depth of insertion. The steps on the bitting could be simply in increasing or decreasing sequence, or alternatively could have only a smaller number of depths arranged so that from each position the two adjacent positions are different, such techniques being well known in the shaft encoder and other similar arts.

A variation on the above just described key without key information would allow the operator of the lock to simply turn a dial, as are well known in the mechanical and electronic combination lock art, having suitable indicia and/or click stops. Some such dials could contain a part that fits into the keyway, and which preferably is retained in the keyway against some force, for user convenience and familiar feel. The dial part could communicate its position to the part in the keyway under a height sensor either by a rotating shaft or an element that is raised or lowered without rotating. The first type could simply be like a shaft encoder. The second could simply be cammed into a height by a camming surface on the inside of the dial that varies with rotational position of the dial In any case, pushing a knob in or otherwise changing its configuration should allow it to turn the plug for unlocking.

A preferred alternate embodiment would allow any key— not an authorized key or special key—to be used to enter a PIN code. XYZ could be entered with any key, simply by attempted turning X times in a first rotational direction and then Y times in the other rotational direction, and Z in the first direction. Another approach would be to turn back and forth the number of times represented by the digit and to remove and re-insert the key between digits. The turning of the key could for instance be measured by the sliding plate or a capacitive sensor array.

A PIN code could be used to make the lock learn a key, thereby allowing the emailing of the PIN code to all the people who will need to begin using a particular lock possibly to the exclusion of some or al exiting users.

Battery Replacement

In some embodiments the lock may require an internal power source, which will be referred to as "power pack". The power pack could be implemented by one or more known batteries and possibly associated circuitry, or any other source of electrical power, including solar or other passive collector techniques, fuel cell, etc. If this power pack is such that it may require replacement or other maintenance during the anticipated lifetime of the lock, then a way should be provided to allow it to be removed and replaced.

One way to allow power pack replacement is simply by means of a closure or other fastening means that is easily operated but not accessible from the front of the lock. This will be referred to as a "back closure" and is said to be operable from the "back" of the lock. For example, a simple snap in plastic cap in a drill hole in the back of a mortise or rim cylinder could hold a cylindrical battery in place; it could easily be pried loose, the battery replaced, and then re-inserted.

Another, and perhaps much handier, means for power pack replacement uses a "front closure". This means that there is a protective cap on the front face of the lock housing and/or plug (i.e. accessible from the same space as the keyway is accessible for insertion of the keys). This front cap might include sealing means to provide protection against contamination, such as dust or moisture. In some environments, the front closure could simply be operated by anyone, such as if it were a threaded plug, like a set screw, that could be operated with a coin or screwdriver, as are well known.

In many environments, a front closure should not be easily operable by vandals who might disable or remove batteries and thus potentially render the lock inoperable. Another issue in some contexts is that the closure should not significantly impair the security of the lock against physical attack, including attacks that may wish to tamper with or even add mechanism.

One way to prevent vandals, or others not in possession of a valid key, from operating the closure is to ensure that it can only be operated when the lock is in a special physical configuration. For example, only when the key is turned to a particular designated angle, thus giving reasonable assurance that the person(s) attempting to remove the front closure is in possession of a key that has successfully unlocked the lock. As will readily be appreciated, this can be achieved for example by an element, such as a ball, that is normally positioned at the interface between the body and cap, so as to prevent the cap from being able to be rotated and removed. But when the plug is in a certain rotational position a recess in the plug comes into alignment with the ball, allowing it to be cammed by the cap out of the cap, thereby allowing the cap to be rotated and removed.

A front closure that is operable when unlocked can be combined with a back closure. One reason would be that even if there is provision for power to be supplied by an I/O means, some users may only have metal keys and would thus be unable to open the lock and replace its battery. Where locksmiths or service personnel do battery replacement, and there is provision for external power, this problem may not occur.

Another way to secure a front closure against tampering would be to use some kind of mechanical means operable from the back of the lock, "back operable" closure. This could be a special mechanism or it could be adapted to cooperate with the means traditionally used to hold lock cylinders in place.

For instance, a so called "mortise" cylinder is threaded into the lock housing in such a way that it can be twisted out from the front; however, it is held from being able to rotate by a set screw, and this screw is only accessible along the edge of the door when it is open. This set screw could be adapted to cooperate in additionally retaining the front closure. Thus, loosening the set screw would provide space for the ball, so that the ball could be cammed out of the way of the cap.

Another example is so called "rim" cylinders. These are typically held in place by two or more screws that are operated from the back of the door. Mechanism could be adapted to cooperate with such a screw so that only when the screw was substantially unscrewed could the front closure be operable. Similarly, in this configuration, one of the screws being back out would allow the ball to move out of the cap a leave its interface with the body free so that the cap could be unscrewed.

A front closure could be arranged to be operable when either of two enabling means are actuated. For instance, one means might be that the lock is in a particular configuration, as described above, and another would be some kind of means not operable from the front of the lock, such as already described. In this example, even if the power pack is so low the lock cannot unlock, a screw not accessible from the front could be turned to allow the battery to be replaced. Thus the advantages of the front closure are combined with those of back operable closures. The ball element described for each night be able to move into two different places to free the cap: one becoming available when the plug is in a certain unlocked rotational position; the other becoming available when the retaining screw, whether in a mortise or rim type configuration, is backed out sufficiently.

Retaining Key in Keyway

It is believed that there are various advantages to retaining a key in the keyway, so that the user does not remove it while the lock is being operated. One advantage is that this is familiar, as conventional locks do this. Another is that if the key is removed carelessly leaving the lock in an unlocked state (which would not be possible if the key were retained as in conventional locks), access might be gained by persons who detect/recognize this situation and do not have a key or do not wish to use a particular key because of logging.

An embodiment with mechanical sensing of the bitting profile might automatically provide locking. But this is believed to depend on the particular key bitting pattern. If, on the one hand, the pattern keeps the sensor at its highest point during unlocking, then little retention is provided. If, on the other hand, the sensor is at a lowered position and the bitting immediately to the back of it is at a higher position, then the sensor could retain the key if it were held down.

One exemplary additional approach to key retention would be to use one or more balls or other elements that ride up and down on the bitting profile at various distances into the lock, and that can be kept from raising while the lock is rotated outside of its home locked position. These could be held in bore holes and springs could push them down against the key, as in known "pin tumbler" locks. They could be held in place by a toothed member that is pushed horizontally into engagement with a ball; each tooth would correspond to a key bitting height range for the position of that ball. The toothed member could be urged into engagement with a ball by a cam action from the sidebar; it could be urged back into an un-engaged position by a spring. The above approach relies on at least one of the balls engaging at a height that is lower than a height deeper on the key, and preferably near the ball. A key with a simple taper getting thinner towards away from the fob clearly has no such points.

A different approach to key retention would be through a brake like mechanism, in which at least one brake "shoe" is pushed up against the side of the inserted key. The shoe is of a material that is preferably deformable and also preferably more sticky than slippery. Thus it engages the micro surface of the key, and could even engage macro features of the key, such as the bitting if it deforms far enough.

An exemplary way for such a brake to be operated would be ply by a camming action from the lock body that the plug rotates in, much as the well known and widely used mechanism of a "sidebar" forced into the plug during unlocking (or forced out of the plug into the body in case the actuator is there). A deformable member, such as a helical spring, could urge the brake out of the way of the key when the lock is in the locked rotational position. The brake cam could, for instance, be simply a ball that is cammed into the plug when it is not over a recess in the body, and where that recess is positioned so that the cam is over it when the lock is in the unlocked position.

A plastic ball bearing might be a good brake, as it could easily be pushed out of the way when in the unlocked position; a second ball could ride against the bore hole and enter a recess for the locked position. Two sets facing each other would reduce the amount of travel needed. Spring force applied to them could also act to keep the key centered during sensing motions. In case of multiple key pulls, there would be multiple recesses, one corresponding to each.

Protruding Slot

The keyway slot can be extended out past the front plane of the lock, as with some automotive steering column locks, so that it can be turned with the fingers and a key can still be inserted into it. The protrusion might contain a key sensing switch, and provide for earlier detection of the key being inserted. It might also be made of a material with a shielding effect on energy measured by the sensors. And it might allow easier and smoother turning of the key, possibly eliminating the need for claiming the key during rotation.

Moreover, for those configurations where no key is provided for, or other situations when a key is not present, the lock can easily be operated.

Non-rotating Version

In some embodiments, no mechanical locking may be provided and sometimes the sensor system could be used simply to inform another device that a particular key has been inserted. Examples include when the presence of a valid key is simply logged, such as for the rounds of a night watchman, an elevator that stops on a particular floor, a machine that becomes operable, a gate that opens, or a burglar alarm system that is activated. In others, the locking may be by a wholly separate system. For instance, the mechanism might allow standard electric door strikes to be operated, or an electronic catch to a minibar. In such cases, the mechanism need not be configured to rotate, or if it is, it may not need to be rotated to cause at least some desired result& Of course, various types of mechanical movement other than rotation, such as axial movement, can be considered alternate embodiments not only for versions where motion is not required, but also for those where it is.

DETAILED DESCRIPTION OF PREFERRED EMBODIMENTS

Figure 1:
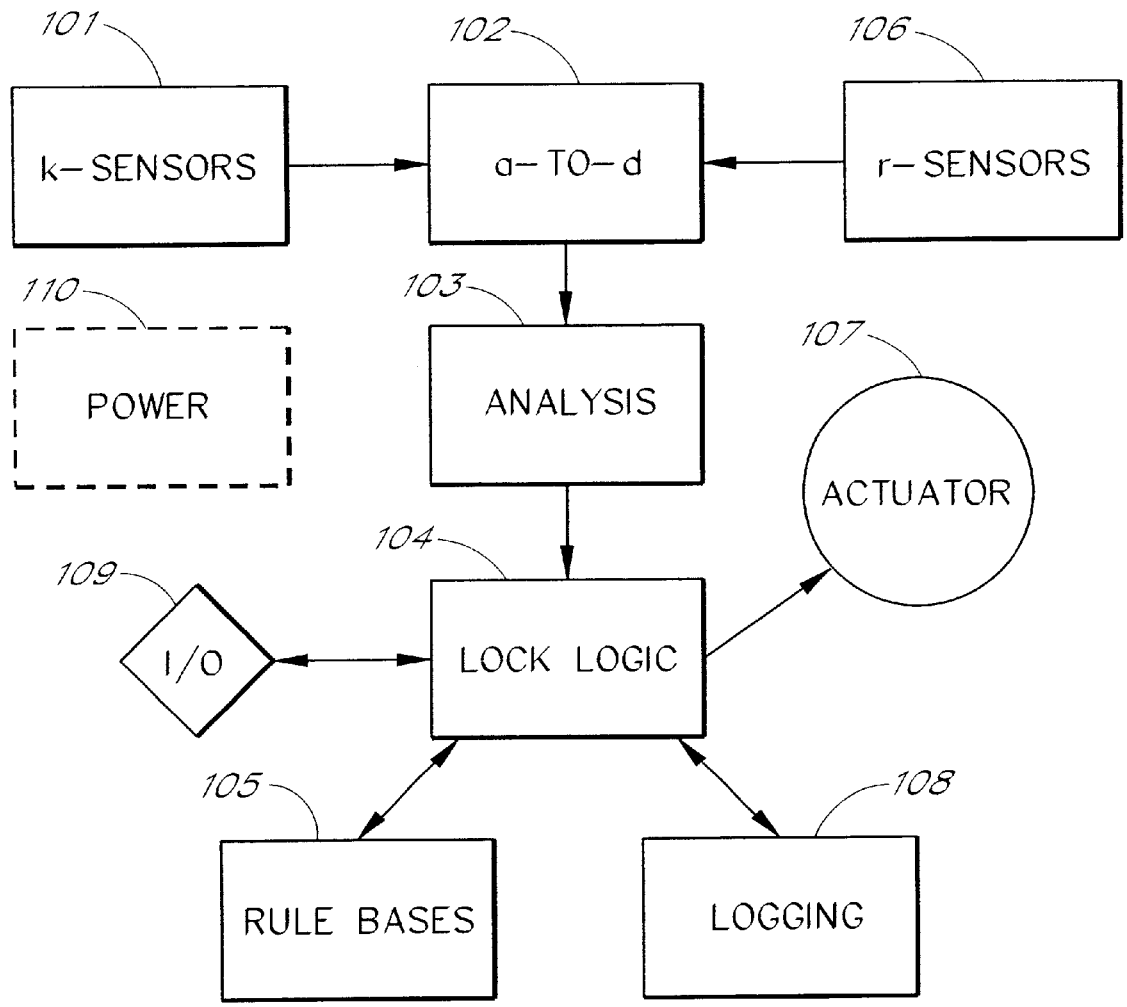
FIG. 1 shows a combination functional and detailed block diagram of an electronic lock in accordance the teachings of the present invention.
Figure 2:
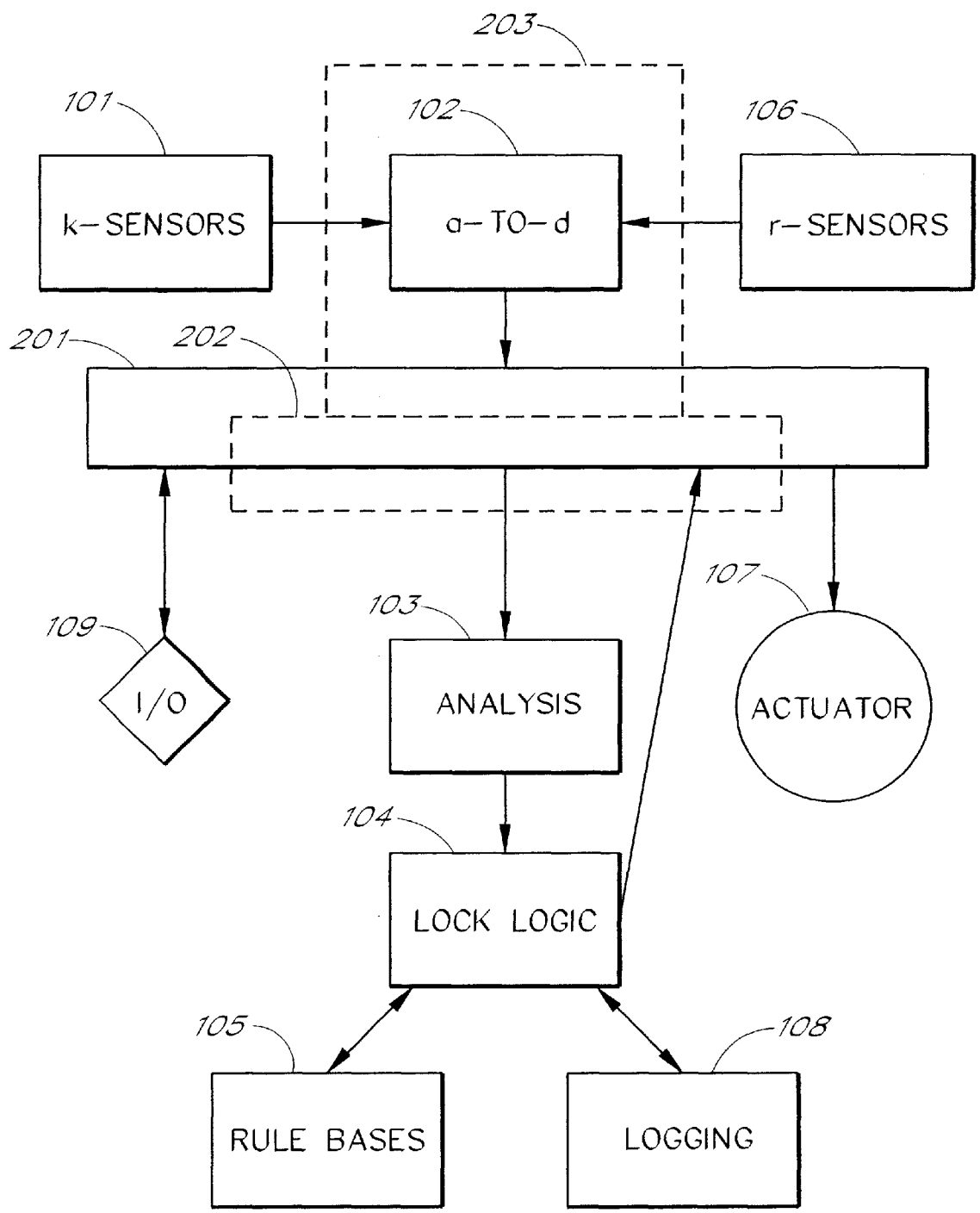
FIG. 2 shows a combination functional and detailed block diagram of an electronic lock partitioned between a rotatable part and a fixed part in accordance with the teachings of the present invention.

Turning now to FIG. 1, a detailed combination block and functional diagram of a preferred embodiment of the invention is shown (and a split version of it is shown in FIG. 2). The "k-sensor" 101 represents the position sensor that is varied responsive to the key profile as the key is moved longitudinally within the keyway, various possibilities for such sensors having been described already and preferred examples are to be described in more detail. (The key sensor may, as in a preferred embodiment but not shown here for clarity, also serve a switching function that can power the lock up from a lower- or no-power state.) Its output is shown as input to "a-to-d" 102, which is an analog to digital converter that samples at a sampling rate and resolution already described. The a-to-d 102 takes values of sensor 101 and transforms them into a quantized form, such analog to digital converters being well known in the micro-controller art. The quantized samples are then provided to the analysis means/step 103, which transforms them into a feature set as already described. The feature set is then compared by "lock logic" box 104 with one or more templates obtained from the rule base data storage element 105, such dial processing and storage means/methods being well known in the microelectronics art. If the feature set acceptably matches a template whose rule interpretation allows unlocking, the lock logic prepares to unlock.

At this point of unlocking, the optional "r-sensor" 106 may be used to sense rotation of the lock or other motion preliminary to opening. If sensor 106 is used, its output may be fed through the a-to-d 102, as shown, or optionally this conversion may not be needed in the case of a discrete output of the sensor 106, such as a simple switch. In either case the sensor 106 output can be thought of as passing through some analysis step/means, shown for clarity as again analysis 103, which may simply provide temperature compensation, switching and multiplexing of this a-to-d output. The lock logic 104 then uses the analyzed output of the rotational sensor 106, or the direct digital output of the sensor 106, to decide when to energize the actuator 107 that allows physical unlocking. (A variation allows the rotational sensor switch to interrupt the power to the actuator at all but some rotations.) The rotational sensor can, among other things, also be used to determine when the lock is in the locked rotational position and when it may be in other positions.

The lock logic 104, generally responsive to the rule base 105, determines what must be logged, and provides such data to the logging step/means 108. The log 108 and rule base 105 may each also be interrogated and/or modified by the lock logic 104, as already described.

The lock logic 104 also optionally interacts with "i/o" means/steps 109, and thereby provides information to the user and/or external apparatus as well as for the purpose of obtaining information from such user or apparatus, all as already described.

Power means 110 are shown without indicating explicit connections with the other blocks for clarity. For instance, some devices may require power directly, or may obtain it indirectly from other devices, and there may be plural power sources and/or reserves and various techniques for converting and regulating the power that may be required by various device technologies, all as is well known in the electronics art.

Means and methods for implementing the various functions/devices are well known in their respective arts. The key sensor 101 may be a resistive plastic potentiometer, as are well known in the art, and described latter in a preferred embodiment. The digital to analog conversion 102, as well as analysis 103, lock logic 104, and storage means 105 and 108, are all well known in the digital microcontroller art. Actuator 107 might be a an adapted form of solenoid, holding magnet, dc motor, or integrated circuit actuator, for example, as are well known in the electromechanical art, and some of which are described in more detail with reference to preferred embodiments. The rotational sensor 106 may be as simple as an electrical switch or a potentiometer configured to sense position, as already described, or be a shaft encoder or one of a host of other rotational motion or position sensors known in the art. The input output means 109 might be simple galvanic contacts for well known serial communication, non-contact coupling, and may interface to humans by such means as optical, tactile or audio, al as are well known in the electronics art. The power source could be a lithium battery, for instance, or any other suitable source known in the art.

Turning now to FIG. 2, a combination block and functional diagram depicts potential splits of the inventive apparatus and steps of FIG. 1 into two parts: a "remote part" located with the lock logic 104, analysis 103, rule bases 105, logging 106 and some potential input output means not shown for clarity; and the "lock part" located with the lock itself, including sensor 101 and actuator 107, as well as optional rotational sensors 106 and optional input/output facility 109.

The interface 201 is itself split between the two parts. The analysis 103, lock logic 104, rule bases 105 and logging 106 would communicate, via links shown directly from lock logic 104 and to analysis 103, with interface means 201. Dashed box 202 shows a section of the interface located with the remote part; the remainder of interface 201, apart from communications means not shown for clarity, is located with the lock part.

The dashed box 203 indicates that in some embodiments analog to digital converter 102 will be located with the remote part (and thus boxes 202 and 203 are in those cases considered a single box); in other embodiments, the analog to digital converter 102 remains with the lock part. When the converter 102 is with the remote part, then at least some analog signals flow across the interface; when it is with the lock part, at least some digital signals flow across the interface. While it is believed preferable to either have only analog interfacing in the lock, or to fully use digital communication, certain embodiments may use a hybrid. An example would be a high-power analog signal that operates the actuator, with the sensor and i/o signals being low-power digital. Another would be any type of modem technology used to convert digital to a kind of analog. Such various approaches to splitting devices between a central and remote part are well known, such as in the access control art.

Figure 3A:
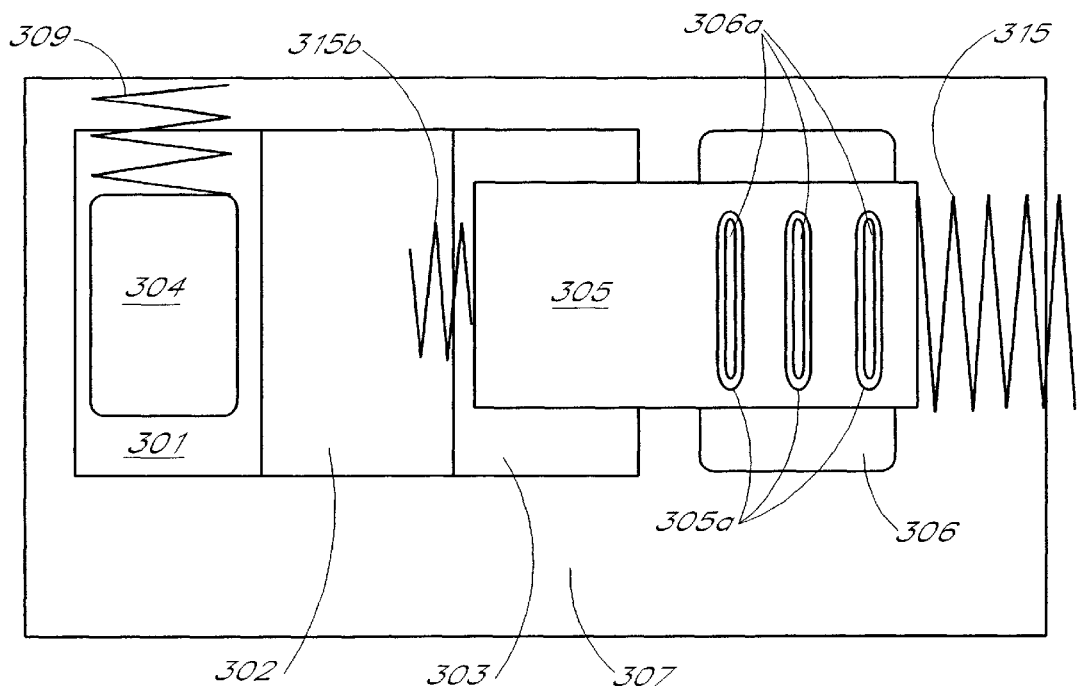
FIGS. 3a and 3b show a combination functional and sectional view, the two views being perpendicular to each other, of an integrated electronic lock in accordance with the teachings of the present invention.
Figure 3B:
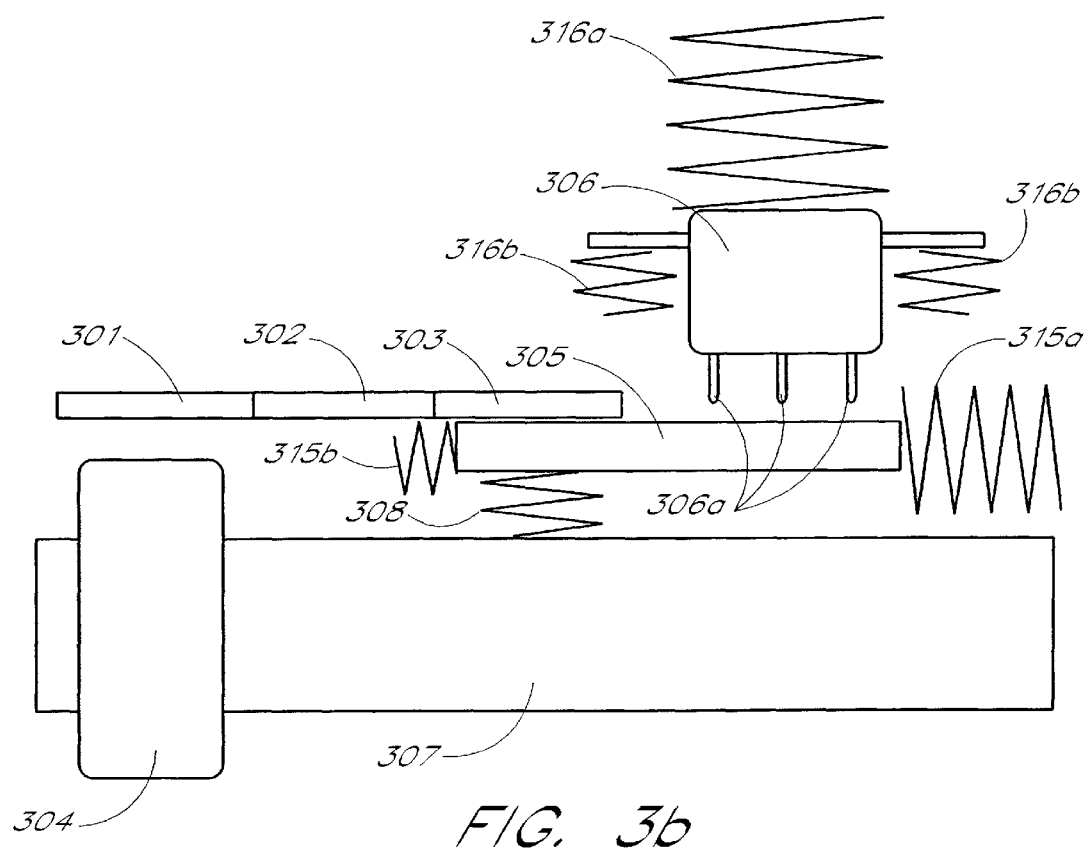

Turning now to FIG. 3, a detailed description of the preferred embodiment with electronics in the plug will be presented, with reference to FIG. 3 through FIG. 5. FIG. 3a is a front view perpendicular to the chip surface and FIG. 3b is the corresponding top view perpendicular to the chip surface.

The silicon "chip" is divided for convenience into three areas: 301 is the magnet field detector for sensing key profile motion; 302 is all the digital processing, storage, and communication parts required by the lock, as already described in detail; and 303 contains the cantilevers for the micro actuator.

Magnet 304 is what sensor 301 detects the motion of. It is shown as a bar perpendicular to the axis of key insertion. This is believed potentially preferable to a ball in this embodiment, since: it ensures that the magnet orientation does not change; can come closer to the chip than a ball; and might actually only be magnetic on the end near the chip, thereby reducing the potential for accumulation of magnetic particles in the keyway.

Plate 305 is mounted so that it can slide a small distance from left to right in the diagram. One side of it slides over the cantilever area 303 and has the cavities formed in its hiden surface (as will be more apparent with reference to FIG. 5, which details one). The other side has slots through it, to be described later. There are three springs shown cooperating with plate 305. The first is the primary spring 315a (which is shown for clarity as not round in cross section) that moves the plate, unless the cantilevers restrain it, during the unlocking phase, as will be described later. The second is counter spring 315b, which serves to reposition the plate 305 during locking when the force of spring 315a is removed. The third is spring 308, which holds plate 305 against the surface of chip 303, and plate 305 is otherwise mounted to be able to slide in the line described by means not shown but that would be obvious to those of skill in the mechanical art.

Blade base 306 is also mounted so that it is free to travel along a line segment, but this segment is perpendicular to the line of travel of plate 305. The blades 306a need not be sharp, but could be formed, as an example, from sheet metal molded into a metal base. The blades 306a are configured to be received by the cooperating slots 305a in plate 305, as shown. In the locked state, as can best be seen in FIG. 3b, the blades are at the end of their travel that does not penetrate the plate. When urged forward in unlocking by spring 316a, they attempt to penetrate the slots 305a. If plate 305 was allowed to move forward itself because the cantilevers were retracted, then the slots 305a are lined up with the blades 306a and the blades 305a penetrate fully through the plate 305 and substantially further to the end of their linear travel. During locking, the counter springs 316b return the blade base to the initial end of its travel, free from the slots 305a.

Also shown for completeness is the keyway 307. It will thus be appreciated how the magnet 304 can cross over the keyway and extend some distance on either side, in particular close to the sensor 301, as already mentioned.

Turning now to FIG. 4, exemplary embodiments are given of the cam action that drives the primary springs in FIG. 3 and also the sidebar not shown in FIG. 3. FIGS. 4a and 4b show the smaller ball that cams the plate primary spring, 4c shows the larger ball that cams the blade base primary spring, and 4d shows the sidebar. All four figures are sections perpendicular to the axis of the keyway showing both part of a lock body 401 and its plug 402.

Figure 4A:
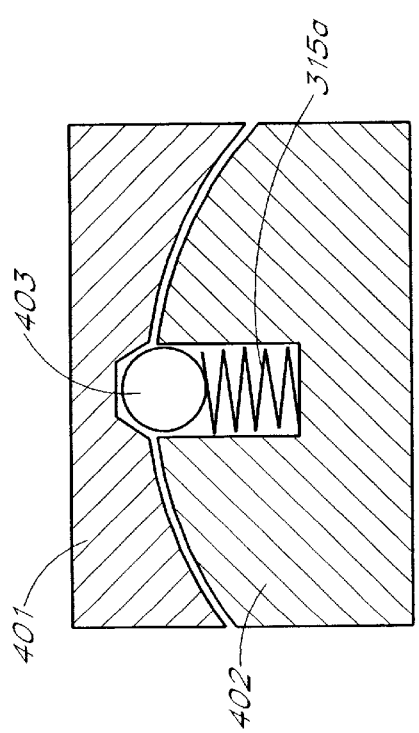
Figure 4B:
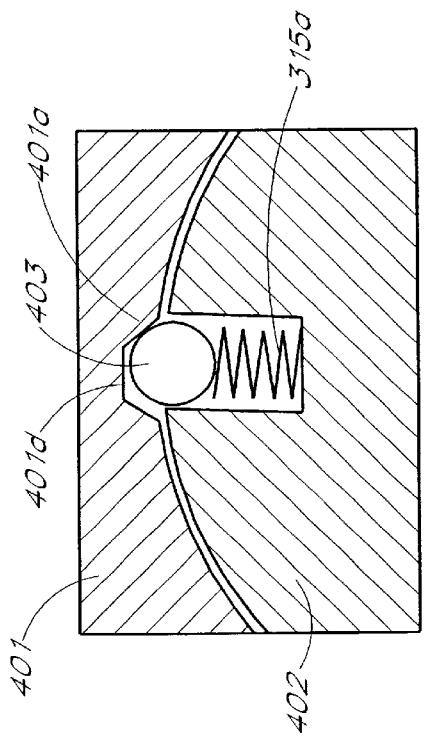

FIGS. 4a and 4b show the small ball 403, preferably stainless steel, partly in the drill hole in the plug 402 and partly in the slot in the body 401. The ball 403 is pushed towards the body by spring 315a. In FIG. 4b camming surface 401a pushes ball 403 down into the drill hole in plug 402 as the plug 402 begins its first phase of rotation. Dimple 401d (not called out in FIGS. 4a but 4b for clarity) provides for ball 403 to move initially a small distance up, as it slips off dimple 401d (because the plug is normally held in the twelve o'clock position by spring detents not shown for clarity) before being cammed down. This provides the slight motion in the reverse direction during unlocking that allows un-jamming of cantilever parts as already mentioned.

Figure 4C:
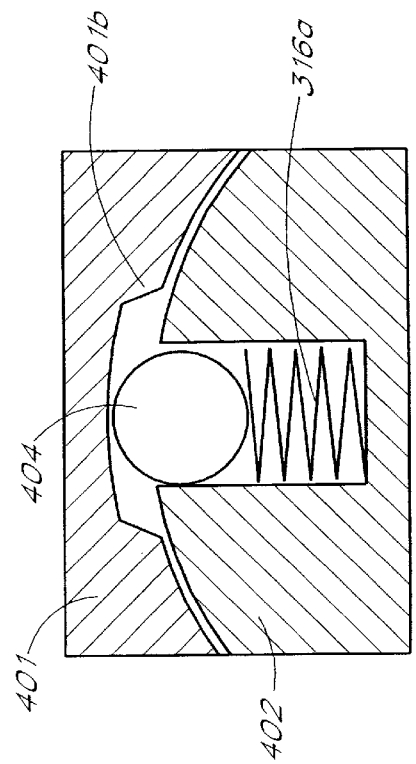

FIG. 4c shows the larger ball 404 being urged up toward the larger cord slot in body 401 by spring 316a. It will be appreciated that surface 401b does not engage ball 404 until the first rotational phase is over and a second phase begins, thereby allowing plate 305 to move first before the blades 306a contact it.

Figure 4D:
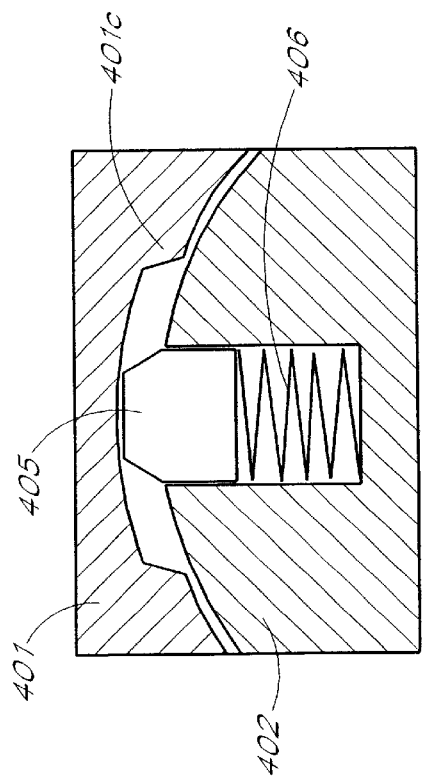

FIG. 4d shows sidebar 405 and its spring 406, such sidebars and corresponding springs being well known in the lock art. The slot has the longest cord and thus phase two will be substantially over before phase three is begun by camming surface 401c engaging sidebar 405. This allows the blade base 306 to move out of the way of the sidebar 405 before the sidebar 405 attempts to move into the unlocking position, which it could not reach if the blade base 306 were not moved substantialy. The blade base 306 would not be able to so move if the blades 306a could not penetrate the slots 305a in plate 305, which would result because at least some cantilevers restrained plate 305 against its being slid substantially by spring 315a.

As has been explained separately above, when the plug is returned to the locked position, the third phase is left before the second is entered, and the second is left before the first is entered, and phase zero is entered as the plug returns to the position shown in FIG. 4a. This sequencing makes sure that the sidebar 405 is not contacting the blade base 306 while the counter spring 316b is trying to return it to the locked position. Similarly it ensures that blades 306a are not contacting plate 305 while counter spring 315a is attempting to return it to the locked state.

As will be appreciated, mechanical linkage may be used to change the effective relative position of the ends of the primary springs 315a and 316 a shown in FIG. 3 from those same springs shown in FIG. 4. For instance, spring 315a might push on a rod, a lever, or a cam, that then pushes on ball 403. Such mechanical linkages being well known in the art and not shown here for clarity.

Turning now to FIG. 5, exemplary embodiments are shown of a single cantilever and matching cavity in four different configurations. They show the locked configuration, the plate moving in the locking direction camming a cantilever back into its retracted position, a retracted cantilever allowing unlocking, and a retracted cantilever that has no effect because it is not aligned with a cavity n a random arrangement.

FIG. 5a shows a cantilever 501a in the locked position, with the gap 501b etched or otherwise formed under the cantilever 501a. The part of the cantilever that protrudes above the surface of the silicon 303 is shown as 501c. It may be a separate deposit of material, or it is may simply be part of the cantilever, with the surrounding surface of the silicon having been etched or otherwise brought down to a level below that of 501c. The protrusion 501c enters cavity 502a. It restrains plate 305 from sliding to the left, and thereby unlocking, by directly blocking business end 502b from being able to move through it.

FIG. 5b shows the cantilever protrusion 501c in the process of being cammed downward by camming surface 502c of plate 305 as the plate 305 moves to the right and towards the locked position. Cantilever arm 501a is bent, much as it would be if it were in the process of being retracted.

FIG. 5c shows the cantilever arm 501a in the fully retracted position, which brings the protrusion 501c out of the cavity 502a above it, ready for unlocking by the sliding of the plate 305 to the left.

FIG. 5d shows the cantilever arm 501a and protrusion 501c fully retracted. But instead of a cavity above the protrusion 501c for it to lock into, part of the plate 502d is above. This means that even though this cantilever 501a has been retracted by the lock logic, it has no impact on unlocking because it cannot retain plate 305 in this relative positioning of the plate 305 and silicon 303.

Turning now to FIG. 6, a detailed description of another preferred embodiment will be described in detail, with reference to this FIG. 6 through FIG. 10. This FIG. 6 shows an isometric view of an exemplary embodiment cutaway to expose, as will be appreciated, some of the main parts and their placement.

Body 1 is the housing that provides support for many of the components and can be readily configured to fit into, for instance, mortise, rim and deadbolt types of door locks, as is well known in the art. For definiteness, but without loss of generality, it can be thought of as a brass cylinder about 1.25 inches in diameter and also about 1.25 inches deep. Its shape and function will be more fill described with reference to the other components it supports as they are described.

Plug 2 is configured to be able to rotate freely within body 1. It can be seen also in isometric view in FIG. 9, and figures prominently in the sections of FIGS. 7 and 8, which reveal other aspects as will be described. It has a keyway slot formed in it that could, for instance, as is well known in the art, be broached in a piece of turned brass. This slot visible in FIG. 1 is essentially as usual except that it is without the common "warding" pattern that prevents all but certain key "profiles" from being able to be inserted. It thereby allows many types of keys to be used. For instance, a width of a tenth of an inch, height of about three eighths of an inch, and a depth of about an inch and a tenth is believed to allow many types of quality door lock keys to be inserted, as has been verified empirically.

Slider 3 is configured to be able to move in a plane perpendicular to the axis of the plug 2 and is further constrained to move only within a radial line of the plug that also lies in the plane. It is shown as a preferably stainless steel plate of about forty thousandths of an inch thickness sliding within channels cut in the guide pins 1a, which are pressed into body 1, on each side of slider 3. The slider 3 is shown in this FIG. 1 at the bottom of its travel, i.e. closest to the plug, as also in FIG. 7a, in some intermediate heights in FIGS. 7b and 8a, and in maximum height in FIG. 8b, al as will be described with reference to the respective figures. It supports sensor parts that move relative to fixed sensor parts, as will now be described.

Board 4 is an electronics board, that also for economy is preferred to support fixed sensor parts, as will be described in detail particularly with reference to FIG. 10. The board 4 also includes, for instance, a chip and wire mounting, as will also be described with reference to FIG. 10. Board 4 is, although its wider part is hidden by the plate in the this FIG. 1 but visible in FIG. 10, for economy and convenience, aligned by guide pins 1a, already mentioned, as indicated by the exemplary means of corner tracks cut longitudinally, visible in FIG. 6. It is held in position against these and at the bottom against the body by adhesive and/or deformable members not shown for city, thereby preferably avoiding forces on it, from mounting or temperature changes, that could cause it to crack and/or break any conductive paths it may contain.

Latch 5a-b-c is shown in an example embodiment as a plunger 5a, latch ball 5b and solenoid body 5c. These can be seen also in locked isometric view in FIG. 9, for clarity without being called out explicitly. FIGS. 8a and 8b show them in the locked and unlocked configuration respectively. The operation will be described later with reference to FIGS. 8a and 8b. The solenoid body is held in position by body 1, and the plunger 5a is backed up by body 1 to resist being bent when force is applied by locking ball 5b. And locking ball 5b is held partly by body 1, and partly by plug 2, so that it is constrained to travel only in a line radial to the center line of the keyway, as wM be more clearly seen with reference to FIGS. 8a and 8b.

Battery 6 is one of two symmetrically positioned cylindrical batteries, shown as examples of possible power sources. They are inserted in drill holes from the back of the body and wired, not shown for clarity, to the board 4 on wire pads 4c, to be described with reference to FIG. 10. Of course some embodiments receive power from outside and/or generate their own power. Also retrofitting to certain deadbolt configurations may require different battery placement/shapes, but batteries shapes can be adapted, as for instance it is believed that lithium batteries can be formed from thin sheets that can then be shaped.

Spring bars 18 are shown, the left one only at the slider 3 end and the right one only at the back end where it is held rigid against body 1 by set screw 18a. They are symmetrical and both extend from their respective champing set screw 18a, through drill holes shown cutaway, all the way to rest on top of the slider 3. Spring bars 18 extend forward of the slider in some positions of the slider so that as it rises, and they retract as they are deformed, they still rest on the top of the slider 3. These spring bars 18 provide a downward force on the slider 3 that is in turn communicated to ball 3a (as will be described in detail with referrence to FIGS. 7 and 8) that rides on the inserted key and tracks its profile. The force should preferably be constant, and there are many possible spring configurations known in the art, but the force should be sufficient to provide good tracking and not too strong so as to make it too difficult to insert a key in; it is believed, based on empirical study, that the combined force of a few spring pins in a conventional lock cylinder may be suitable.

Turning now to FIG. 7, which has two parts 7a and 7b, each showing (a partly cutaway section with hiding those element not directly cut through) the lock through the already described center plane of slider 3. The first one, FIG. 7a, shows the lock in locked position and without a key inserted, and thus with the slider 3 at its lowest position. The second cutaway, FIG. 7b, shows a key having been inserted and, due to successful unlocking, the plug 2 rotated clockwise to roughly 1:30, with the slider fully pushed up.

Key ball 3a, not having been shown in FIG. 6, but as already mentioned, rides on the key profile. Its size should be sufficiently small that it traces the profile adequately to read the key features. It is believed that a one eighth inch stainless steel ball bearing, as verified experimentally, would perform adequately. (Of course, as would be obvious, a pin or other shape could be used with some advantages in security of mounting.) The key ball 3a is at the bottom of its drill hole in the plug 2, as can be seen in FIG. 7a. The key ball 3a never leaves its linear travel in the drill hole in the plug 2 and the drill hole need not extend into the body. Even a key with the full height of the keyway only causes the ball to be between the top of the keyway and the boundary between body 1 and plug 2.

Cam pins 2a, not having been shown in FIG. 6, will also be shown in FIG. 9, are essentially hardened inserts intended to reduce wear and promote smooth tuning of the plug when the slider 3 is at least partly down in the bore hole that the plug turns in. They might, for concreteness, be hardened stainless dowel pins of about one sixteenth inch diameter that are pressed into recesses milled axially along the side of plug 2, as can be seen in FIG. 9. In FIG. 7a they are partly supporting slider 3 as it is pressed down by spring 18 and also supported by key ball 3a, although exactly which supports the slider 3 in this configuration is believed unimportant to correct overall function.

In FIG. 7b, the left cam pin 2a is shown in camming engagement with slider 3, as the key 20 is presumably being toned clockwise. The slider 3 is still in the slot in the plug and must be pressed up out of the plug so that the plug 3 can be rotated all the way around, as required by some lock configurations. If the key 20 raises the key ball 3a fully when the lock is being turned, as some keys do, then the key ball 3a holds plate 3 out of the plug, at least in the locked rotational position; but, as the plug 2 is tamed, the slider 3 may still come down into the plug, and will require being cammed up by the cam pins 2a.

Several elements already shown in FIG. 6 appear again in this FIG. 7 in a different view that would not require explanation: lock body 1 can be seen cutaway above the center for clarity; guide pins 1a can be seen in center section for their whole length, spring bars 18 can be seen in section as they rest on the slide 3.

Several not yet introduced elements will be described more fully elsewhere. A section of known key 20 can be seen in the keyway of FIG. 7b, as will be shown more fully in FIG. 8. The alignment pins 7b for holding part of the sensor to the plate 3 will be described more fully with reference to FIG. 9.

Turning now to FIG. 8, which has two parts 8a and 8b, each showing (a partly cutaway section hiding those elements not directly cut through) the lock in a vertically oriented plane parallel with and through the axial center of the body 1 and the axial center of the plug 2. The first, FIG. 8a, shows the lock in a locked state with an example key partly inserted. The second, FIG. 8b, shows the key fill inserted and turned a quarter turn, top into the figure and behind the cut plane, and thus also showing the lock in an unlocked state.

Cam plate 19, well known as but one example in the lock art, is shown for completeness as being attached to plug 2 by screws 19a, and being configured to allow rotation of the plug, but holding it from being pulled out of the body either accidentally or in an attempt to defeat the lock. It cooperates with the flange like widening at the front of plug 2 and matching recess formed in body 1, both as can also be seen here, to prevent the plug from moving axially. It is what allows the assembly shown to operate the actual operator mechanism securing a door, as is we known in the lock art.

Latch 5 can be seen in operation in FIG. 8, as already mentioned. FIG. 8a shows the plunger 5a out of the solenoid body 5c and cooperating to retain latch ball 5b. The small recess shape in plunger 5a is intended to receive latch ball 5b during an attempt to force the lock by applying a high torque to the plug relative to the body, and thus the plunger is prevented from moving axially during such an attempt. During unlocking the solenoid body 5c is energized with an electric current and urges the plunger 5a inwards which is leftwards in the figure.

When the plug 2 is then rotated a quarter turn, the configuration is as shown in FIG. 8b. The latch ball 5b has been cammed all the way out of the plug up into the cylindrical hole in body 1, in a manner widely known in the lock art for sidebars. It travels in a line radial with the plug and straight up into the guiding hole in the body left empty by the retracted plunger 5a. When the lock is returned from the unlocked state to the locked state, the ball is urged down by springs (not shown for clarity) that also return the plunger to its fully extended position.

Key 20, as already shown partly in FIG. 7b, and to be shown in isometric view in FIG. 9, can be seen both partly inserted in a section through its plane in FIG. 8a. It can also be seen in cutaway profile in the section of FIG. 5b. It is simply a stylized example of a particular type of pin tumbler lock key.

Key ball 3a, as already described in particular with reference to FIG. 7, can be seen riding on the key profile particularly clearly in FIG. 5a. It is held against said profile by spring 18, not shown for clarity, through force transferred via slider 3, not explicitly called out for clarity.

Also show, but not called out explicitly, partly owing to miniature size, as will be appreciated, are contact fingers and their mounting block, to be described more fully with reference to FIGS. 10 and 9, respectively. Also the board 4, the top of which was already visible and mentioned with reference to FIG. 6, and to be described in more detail with reference to FIG. 10 that shows it completely in isometric view, on which the wipers appear to wipe, along with a chip mounted to its back side, is seen in profile section through its whole height.

Turning now to FIG. 9, shown is an isometric view of a sub-assembly including a key party inserted.

The slider 3, not called out for clarity, can be seen partly extending into the plug 2. It reveals along its top the block 7a to which the wipers 7 are attached and which is attached to the slider by guide pins 7b, as already mentioned with reference to FIG. 7. Such a wiper set could be soldered, glued or (if it were wider than shown, pinned or riveted) onto the block 7a, which as already mentioned is located precisely on slider 3 by pins 7b. It is believed preferable, however, to electrically isolate wiper set 7 from the metal slider 3, so that there is no electrical connection between the outside world and the sensor electronics. Otherwise, the wiper assembly 7 could be mounted directly onto the slider 3.

The non-conductive block serves this purpose. It could be formed (preferably molded) in such a way that the wipers snap in and are held in good alignment and that it contains the registration pins used to mount to holes in slider 3. It could be made from a "slippery" material, such as Teflon, and include parts that wipe on the tracks 4a and surrounding parts of board 4, preferably totally enclosing wiper 4a, so as to provide a kind of sealing action.

The cam pin 2a can be seen in its recess, as already mentioned with reference to FIG. 7. Also the slot cut, such as with a circular slitting saw, in plug 2 can also be seen in section in FIG. 8.

As will be appreciated, while not called out explicitly for clarity, although mentioned no earlier, a different view of the latch assembly is provided.

Turning now to FIG. 10, an isometric view of the board 4 and sensor mechanism are provided.

The board 4 has an inverted "T" shape, owing to the need for the springs 18 to come down between the guide pins 1a when the slider is at the bottom of its travel. (Of course, alternative spring arrangements, notably those coming from the front of the guide pins, might be used if the board needed to be bigger in some embodiments, and still allow registration of the board 4 with the pins 1a, as this is believed to provide inexpensive but good alignment of the sensor halves.) Alignment pins oriented perpendicular to the axis of guide pins 1a, pressed into it, and pointing straight backwards, would provide another way to align the board to the guide pins 1a, instead of relying on mounting to the body 1, which is believed to reduce precision and increase the cost of that precision obtained.

The tracks 4a are depicted on the surface of the board 4 as recesses. This serves to show the extent and shape of the tracks, although whether they are raised, flush or below the surface of the board is not essential. The wider track, shown at the left in the figure, would typically be a resistive material, such as so called resistive plastic used in high-quality potentiometers. This could be molded, screened, formed from a continues tape, or otherwise applied. The narrower track, on the right in the figure, is the so called "return" track, that is a conductive material, such as a non-corrosive but highly conductive precious metal or other suitable thin layer as are well known in the potentiometer art. Connection of such tracks by a sliding wiper is a well known technique in the potentiometer art that allows a tap to be moved continuously along a resistive path with fixed taps at both ends.

Tracks 4a are not of equal length to indicate how at the lowest position of the slider 3 the electrical circuit is for all practical purposes fully open. This allows the lock electronics to go into an ultra-low power or zero power state and be woken up when current begins to flow since a key is inserted Preferably there would be solid-state switching of power that could keep the power on as long as desired, independent of when the switch opened during key insertion, and could also disable power for periods of time if it is detected that the switch is left closed for too long without key entry being attempted. Alternatively, a capacitor could buffer the gaps in power that might occur during key insertion, in obvious manner.

Connection pads 4c are shown for connecting the board to other electronic devices. Examples are the batteries 6, the latch solenoid 5c, and external input and/or output and/or power.

Integrated circuit 4b is shown as mounted to the board. Of course, many other places and mountings for such circuits could readily be conceived, but this location could be used for SMD or chip on board, or whatever similar mounting technologies, and for whatever electrical components, all in known fashion Board 4 could, as will be appreciated, and as is well known in the art, be made from glass fiber in an epoxy matrix with copper layers laminated to it and plate-through interconnects. In this case, the connection of the tracks 4a, presumably including both ends of the resistive track, to the other electronics could be by means of conductive traces and/or plate-through holes.

Wiper assembly 7 is shown without its mounting block, such block already described with reference to FIG. 9. Its actual wiper fingers can be seen positioned over the tracks 4a, which they are urged into contact with by the spring-like nature of their thin arms. The actual contact can be at the sharp end of the "V" shaped bends located near the ends of the fingers, as is well known in the potentiometer art. The material of the wiper assembly might, as an example, be formed of approximately five-thousandths-of-an-inch-thick sheet of a conductive and springy and non-easily-oxidized precious metal alloy, also is well known in the a potentiometer art.

Turning now to FIG. 11, depicted is an exemplary alternate embodiment of a k-sensors 101. FIG. 11a shows a section perpendicular to the keyway; FIG. 11b show a section parallel with and through the keyway and from above; and FIG. 11c show a section parallel with and through the keyway from the side.

Plates 1101a can be seen to be connected by leads 1101b to chip feet 1101c. The plates 1101a would be conductive and surrounded by, but insulated from, conductive guard rings, well known in the capacitive sensor art, not shown here for clarity, that are preferably connected to ground to improve the signal to noise ratio.

Non-conductive layer 1102, insolates keys from the plates 1101a, which is preferably so also of low dialectric constant, tough enough to resist wear, and slippery so as to reduce wear and allow easy key insertion Suitable material might include, for instance, teflon, nylon, polyethylene, polycarbonate, etc. While the layer 1102 is shown covering substantially three sides of the keyway, it may need cover only the plates 1101a.

Chip 1103 is shown to resemble a standard type of integrated circuit package, but other packaging, such as chip on board, might serve as well. The circuit detects capacitances in the picofarad or femtofarad range, preferably providing a digital output via a-to-d 102 as already described with reference to FIGS. 1 and 2. Measurement of such capacitances are well known, and can be realized, for instance, by the Qprox products of Quantum Research Group, Southampton, United Kingdom. Known in the art is the ability to multiplex the same circuit across multiple plate& One technique believed well known in the art to provide more targeted sensing is to ground the plates adjacent to and near the one being read.

Ground-plate 1104a is a preferably conductive and corrosion resistant element, such as a plate of stainless steel, that is mounted so as to be moveable into the keyway and towards plates 1101a, while remaining substantially parallel with them, and is urged in such direction by spring member 1104a, shown for clarity simply as helical compression springs 1104b. Thus, in this particular embodiment, as the key is inserted, it is pushed by the ground-plate 1104a against the side of the keyway, which means up against the plates 1101a. It could also be urged toward the plates 1101a simply by a camming action resulting from, for instance, the initial tuning of the key or final phase of insertion, which might also activate the electronics, not shown for clarity. Ground-plate 1104a is believed generally to reduce the variable gap between the key and the plates 1101a, as well as to provide a grounding of the key and back limit to the metal detection.

Circuit board 1105 is simply a standard printed circuit board shown as an example non-conducive mounting medium well known in the art. Another known example is a flexible printed circuit board, possibly attached to other rigid components where needed, that could even connect all the electronics in the lock and be folded into place after fabrication. The leads 1101*b*, already mentioned, could be so called vias and traces realized as conductive paths mechanically attached to board 1105. Also, the plates 1101*a* could be copper laminated to board 1105, with boarder etched away and connected directly by vias.

Back 1106 simply indicates the back end of the keyway, illustrating an exemplary rectangular shape of the keyway itself.

Turning now to FIG. 12, three exemplary alternate or additional capacitive plate arrangements are laid out. The first two are drawn as multiple strips, but a single strip version is of them could be used. The third is depicted as a single strip, but could be used in higher multiplicity. The arrangement of FIG. 12*a* is intended for mounting along the top surface of the keyway, FIG. 12*b* shows longitudinal stripes for measuring depth of insertion and key warding patterns, and FIG. 12*c* indicates a generally applicable technique for obtaining definite position measurements.

FIG. 12*a* has an exemplary array of equally shaped and spaced plates 1101*a* perpendicular to the direction of key insertion that are proportioned to suggest their placement along the top surface of the keyway. Thus they can each measure the distance down to a part of the bitting of the fully inserted key. Alternately, a single plate 1101*a* could be used to read the distances as the key is inserted. Two such plates might give the general advantages of two sensors, as has been and will be mentioned further. If water were to enter the keyway, it might fall down, and away from these plates 1101*a*, particularly if the surface of non-conductive layer 1102 is designed to reduce adherence of water. Mechanical means, such as spring-loaded balls, not shown for clarity, could position the key either up to the plates, or preferably down to the bottom, to provide uniform readings and to ground the key.

FIG. 12*b* positions plates 1101*a* on the same surface as FIG. 11, but instead of perpendicular, they are parallel with the keyway. This means they can read the depth of key insertion. One of these plates 1101*a* might be sufficient for that function, and it could be in the space shown along the bottom of the plates in FIG. 11*c*. Multiple plates 11*a* could provide improved signal to noise ratio and some might work better on some keys, depending on the warding pattern. Plural plates can also read information related to the warding (i.e. groves cut lengthwise on most keys). If one or a small number of plates 1101*a* are used at the front according to the configuration of FIG. 11, then the warding pattern could still be read by an array of the type shown in this FIG. 12*b* that is positioned by itself further back in the keyway.

FIG. 12*c* is configured for a key depth insertion type of reading, but could be used for all manner of measurements, not even limited to locks, as would be readily appreciated in the sensor art. The idea is essentially multiple plates connected to a single input to the electronics, to read the number and timing of plates that the target, in this case the key, comes near is read. Thus, as the key is inserted in the exemplary embodiment, capacitance will remain relatively constant and then increase with a step when the next plate is traversed. This provides definite insertion depth information.

Turning now to FIG. 13, an exemplary holding magnet alternate embodiment of an actuator is shown in section. Four operational configurations of the same device are shown: FIG. 13*a* locked, FIG. 13*b* at end of first unlocking phase, FIG. 13*c* at end of second unlocking phase, and FIG. 13*d* attempted unlocking without activation. All the views are sections along the same plane.

Figure 13A:
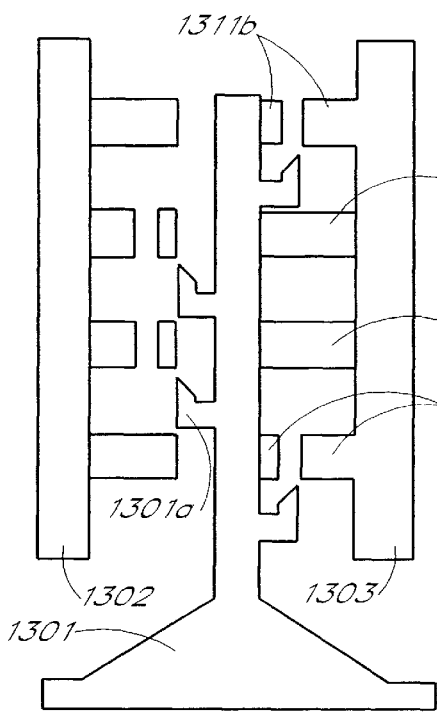

FIG. 13*a* shows the latch plate 1301 in the retracted position, with four hook arms 1301*a*. On one side is holding electromagnet 1302. On the other is permanent magnet 1303. The four sliders 1311, 1312, 1313, and 1314 can be seen all aligned to the left. As will be apparent, if the plate 1301 were to be moved up in an attempt to enter the second unlocking phase, then its hook arms would engage 1311*b* and 1314*b*, and the plate would not be able to move the fill distance into the unlocked position.

Figure 13B:
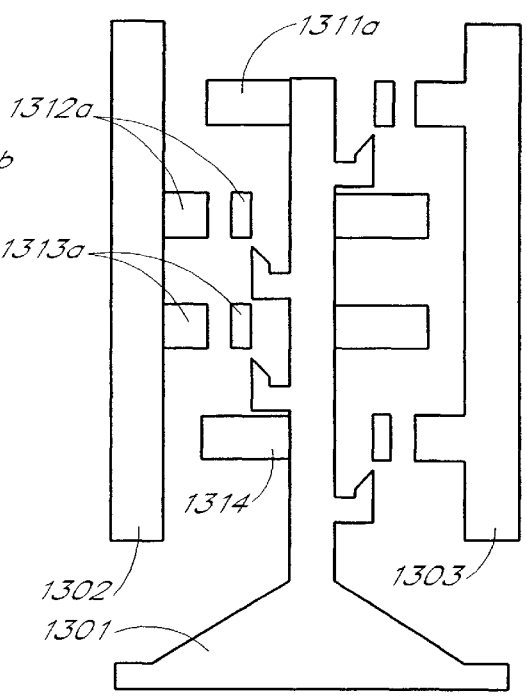

FIG. 13*b* shows magnet 1303 having been moved to the right. This is accomplished by a camming action responsive to the partial initial turning of the lock as already described elsewhere. In this FIG. 13*b*, unlike FIG. 13*d*, the electromagnet 1302 was energized during the separation, and this causes the slider 1312 and 1313 to remain held in contact with electromagnet 1302; the other two sliders stay with magnet 1303. The reason some stay with one surface and some with the other is that they are not as magnetic on one side as on the other, as is shown by the difference in color. In an exemplary embodiment, these sliders would each be cut from two pieces of sheet metal, and joined in the middle, with one piece being much more magnetic than the other. (The trap for the hook shown would then be simply a hole in the corresponding piece of sheet metal). The strongly magnet sides are 1311*b*, 1312*a*, 1213*a*, and 1314*b*; the weakly magnet sides are 1311*a*, 1312*b*, 1213*b*, and 1314*a*. As would be obvious, there might be more or less sliders, and the pattern of arrangement might differ, even from lock to lock.

Figure 13C:
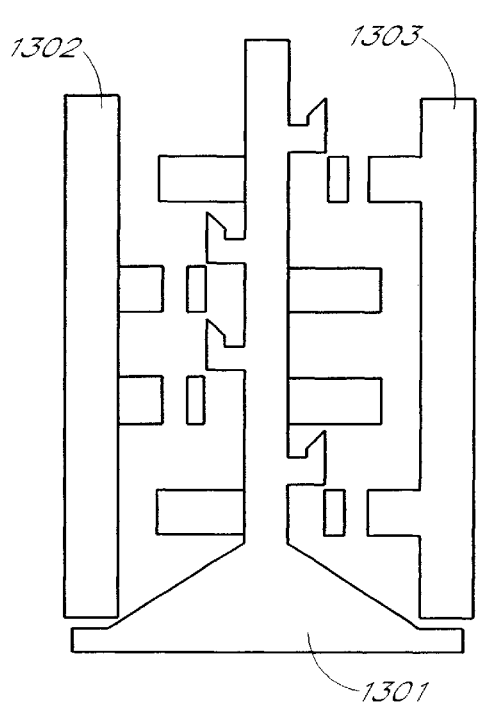

FIG. 13*c* shows the position that the latch plate 1301 can reach when urged upwards after the other elements are at the end of a successful phase one unlocking. This motion would be supplied by a second-phase camming force, as has already been described, and would allow the lock to be tuned, possibly after being amplified by other mechanical means.

Figure 13D:
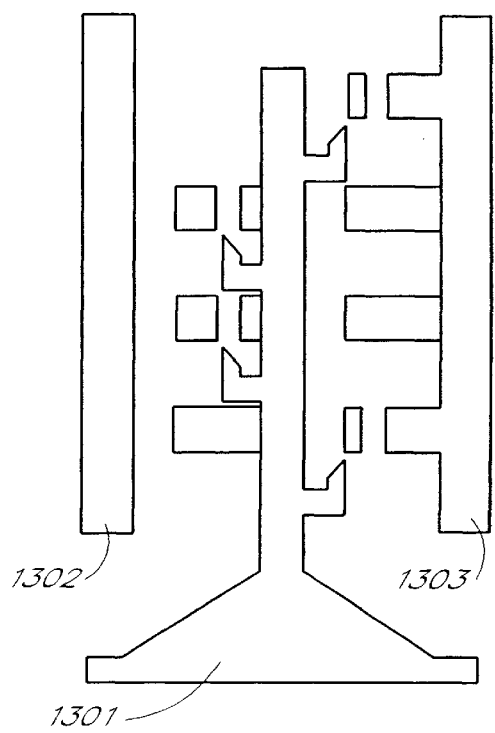

FIG. 13*d* shows the configuration if phase one motion is completed without activation of the electromagnet 1302. Since all the sliders are somewhat magnetic, they all stay with the magnet 1303 and none stay with electromagnet 1302. If the plate is attempted to be moved up, the hooks 1301*a* will engage sliders 1312 and 1313, as can readily be seen, and this will prevent the plate from moving fully upward. As will be appreciated, introduction of random or large forces into the lock in an effort to unlock it will likely cause yet other arrangements of the sliders. It is believed that the configuration shown makes unlocking an unlikely result of such attempts. In particular, attention is drawn to the fact that there are multiple positions that cause the hooks to catch, and only single positions that allow unlocking. Moreover, increasing the number of sliders exponentially decreases the chance of a random positioning unlocking.

One exemplary way to fabricate this inventive latch actuator shown in FIG. 13*a–d* would use for the holding electromagnet 1302 a standard cylindrical design with an inner plug and outer casing, much like a solenoid with the plunger fixed in place against the inside back. The magnet 1303 would be simply a permanent magnet disc of the same diameter and aligned along the same longitudinal axis. The sliders 1311–14 would be sheet metal, as already mentioned. These would be oriented perpendicularly to the plane of the section shown. They would preferably be held by a Teflon cage not shown that allows them only to slide in the way shown in the diagram, that is from left to right between the two magnets 1302 and 1303. The latch plate 1301 would also be cut from sheet metal, but would lie in the plane of the section.

Turning now to FIG. 14, an exemplary alternate embodiment with two sensors is shown in vertical section through the keyway. Much as in FIG. 8a, except that the key reading stylus is duplicated.

Stylus 3a1 and 3a2 are introduced in this embodiment, to illustrate the notion of two dynamic mechanical sensors a small distance apart. The ball 3a is not present; the plates 3a1 and 3a2 directly contact the key bitting profile. (They could be rounded or otherwise formed to reduce wear, not shown for clarity.) As would be obvious, they each have separate springs and sensors so that they can each read the key underneath. Because key bittings have limited angles, the distance between the height of the two in normal use should consequently be limited. This is believed to imply that, for springs such as the flat ones in FIGS. 15a–b, a small cutout in the plate closes to the spring ends would be sufficient for the spring to reach the front plate. One plate could thus have a middle spring and the other two-side springs.

Turning now to FIGS. 15a and 15b, an alternate embodiment of a plate that is able to move somewhat from side-to-side and a leaf spring with attached piezoelectric sensor are shown, although one could be used without the other. The plate, shown in section similar to that of FIG. 7a, has a cutout pattern that is intended to rise up more than a normal plate when the key gets wide, thereby giving a reading of the wide spots, which can, for instance, be used to encode a pattern specific to a particular key-blank code series already mentioned, such as might be controlled by a locksmith. The leaf spring, shown in section parallel with the keyway and looking upwards, replaces the wire spring 18 shown in FIGS. 6 and 7a–b, and has a piezoelectric film transducer attached that generates electrical signal as it is flexed.

Plate 1501 slides up and down in grooves in pin 1a, as in previous embodiments, but is also shaped with rounded sides 1501a to allow some twist while remaining in its plane. The spring 1503 rests on a rounded part 1501b with the same center as 1501a that it is believed not to rise or fall much responsive to the twisting motion. The twisting motion is caused by the recess 1501c at the bottom of plate 1501 that tracks the key bitting area as it may be inserted or move from side to side within the keyway. When a wide part of the bitting passes, plate 1501 rises up because it does not fit in the deepest part of the recess 1501c; a straight cut plate, such as in FIG. 7a, does not rise up at this moment. Thus, with two plates, as in FIG. 14, the sensor system can detect the wide areas, and identify the key-blank series code.

Spring 1503 is shown urging plate 1501 (or any other plate) downward, as it is attached at the opposite end, such as by fasteners 18a. A piezoelectric film transducer 1502 is attached to the spring source, such as by an adhesive or lamination process. (An example is the "Piezo Film Sensors" by AMP, Valley Forge, Pa.) Shown also are two contacts, 1504. One is attached to the top one metal surface and the other is attached to the mostly hidden metal surface revealed by cutout 1502a. As the plate moves up and down, the sheet spring flexes and the piezoelectric effect creates signals that are fed to the a-to-d 102. Of course these signals are substantially proportional to changes in position and can be integrated to produce position measurements, by well known techniques. And calibration can be achieved when the lock is rotated, as the plate is moved to a known height.

Turning now to FIG. 16, illustrated is an exemplary alternate embodiment of a k-sensors 101. FIG. 16a shows a section perpendicular to the keyway; FIG. 16b show a section parallel with the keyway, from above; and FIG. 16c show a section parallel with and through the keyway, from the side.

Coil turns 1601a can be seen to be connected by taps 1601b to circuit board 1604. Non-conductive layer 1602, protects coil turns 1601a from damage by key insertion, which is preferably tough enough to resist wear and slippery so as to reduce wear and allow easy key insertion. Suitable material might include, for instance, teflon, nylon, polyethylene, polycarbonate, etc. It is anticipated that the coil turns 1601a might be manufactured by a continues process, either by being wound around a plastic sleeve or simply by being etched from a plating on a sleeve or foil to be folded into a sleeve form.

Circuit board 1604 is simply a standard printed circuit board shown as an example non-conducive mounting medium well known in the art. Another known example is a flexible printed circuit board, possibly attached to other rigid components where needed, that could even connect all the electronics in the lock and be folded into place after fabrication. The leads 1601b, already mentioned, would be substantially electrically connected or coupled to conductive paths, not shown for clarity, on board 1604. Techniques for doing this, in the case of multiple coils, could for instance be adapted from those known related to connecting electrical signals to LCD displays. As will be appreciated, it is believed that a matrix of drive and sense lines could be employed, so that mile coil inputs might be connected to the same pin on the chip and multiple coil outputs might also be connected to a different common pin; selecting combinations of these pins would substantially select individual coils.

Back 1603 simply indicates the back end of the keyway, illustrating an exemplary rectangular shape of the keyway itself. The internal view of FIG. 16c shows mainly the protective layer 1602 lining the keyway and the substantially round cross-sections of the many tumors of the inductor 1601a.

In operation, the embodiment of FIG. 16 would involve in effect creation of one or more axially oriented coils, by taking multiple taps off the same coil, or by creating actual independent coils. The coils would be driven from a common AC source, such as in the 10 Mhz range. Example values for other parameters might be about 10 turns of 50 gauge wire. A standard AC Wheatstone bridge could, for instance, be used to derive sensitive measurement of the difference in the AC inductance of two coils. This circuit could be multiplexed, by typical high-speed multiplex circuitry, so that various difference pairs could be read in rapid succession. These measurements could then be used to substantially cancel certain external noise. The result would is differences in the AC inductance of various axially spaced coils, thereby yielding information on difference, it is believed, of the approximate amount of air gap at the various cross-section points over time.

Turning now to FIG. 17, three views are shown of an alternative embodiment for AC inductance measurement. High-permeability Ferrite elements 1701 and 1702 are shown, with 1701a and 1701b being inside the plug one either side of the keyway. Matching pieces of 1702a and 1702b, respectively, are shown being wound with inductive coils 1703a and 1703b, respectively. The main plug material 1704 night be brass, from which the keyway slot 1704a is formed. The lock body in this case 1705 holds the various elements as shown.

Turning now to FIG. 18, two configurations of the same actuator and latch arrangement are shown in section, where in FIG. 18*a* the latch is in the locked position and in FIG. 18*b* it is unlatched or open. The leaf spring elements 1814 normally would urge the sliding member 1801 so as to compress helical spring 1810 when the plug is rotated, not shown, while it slides between fixed parts 1803*a* and 1803*b*. This is because the body 1804 and attached springs 1814 would move vertically with relative to the remaining members, as can be seen in the difference between FIG. 18*a* and FIG. 18*b*. As the sliding member 1801 slides, it cams the chamfered end of pivoting member 1802, which causes it to rotate on its pivot point and urge plunger 1806 upwards to compress spring 1811. Plunger 1806 is guided along its axis of movement by being held by neoprene sealing rings 1808*a* and 1808*b*, and its middle section moves between these seals in a bath 1809 of "Rheonetic Magnetic Fluid," such as produced by Lord Corporation of Cary, N.C. Normally, this fluid is in a hardened state because permanent horseshoe magnet 1805 causes enough magnetic flux to pass through it. When, however, magnetic coils 1813*a* and 1813*b* are energized, they counteract the field of the magnet and act to substantially cancel its effect on the fluid 1809, thereby making it possible for the plunger 1806 to slide essentially freely.

Thus, on the one hand, if electromagnets 1813*a* and 1813*b* are not energized, plunger 1806 will meet substantial resistance from fluid 1809 and will not allow pivoting member 1802 to be pivoted to the position shown in FIG. 18*b*, and instead will cause leaf spring 1814 to be deformed and the lock jammed against rotation by slider 1801 continuing to protrude into the recess in body 1804 that it occupies in FIG. 18*a*. But, on the other hand, when electromagnetic coils 1813*a* and 1813*b* are energized, and even briefly, the plunger 1806 will be pushed to the position shown in FIG. 18*b*, compressing spring 1811, and the sliding member 1801 will be pushed free of the cavity 1804 by the leaf springs 1814, and the lock will be able to operate.

Turning now to FIG. 19, an exemplary optical sensor system is depicted in cross section perpendicular to the axis of the plug. The plug body 1905 is shown in section revealing the optional protective and slippery keyway lining 1906. Point light sources 1901 are arranged to alternately or in parallel provide light or infra-red energy or the like possibly in a modulated form into the one side of the keyway. This energy is then able to travel through the air gap in the keyway to the opposite side of the keyway and cast a shadow or shadows of the key onto the translucent member 1902. These images are then reflected by semi-spherical lens, the flat side of which is silvered, onto the detector array 1904. Although the detector 1904 may block part of the image, this can safely be ignored. As the key is inserted, one or more shadow grams move accross the screen 1902 and are observed by the camera and the key profile determined by known processing techniques.

One variation would be that window 1902 would be transparent, and that light sources 1901 could be behind a translucent screen, though this is believed to be more subject to interference by wear and scratching of the window 1902.

As would be obvious to those of ordinary skill in the art, there are many essentially equivalent ways to realize the inventive concepts disclosed. The particular choices that have been made here are merely for clarity in exposition and are sometimes arbitrary. For instance, without attempting to be exhaustive, there are many infra-red or acoustic energy might be employed instead of optical.

It will also be obvious to those of ordinary skill in the art how parts of the inventive concepts and protocols herein disclosed can be used to advantage without necessitating the complete preferred embodiment. This may be more fully appreciated in light of some examples, where in some uses of the inventive concepts, the communication over the door jam might be used by locks that do not accept keys or the latching apparatus might be used in a completely different kind of locking mechanism.

While these descriptions of the present invention have been given as examples, it will be appreciated by those of ordinary kill in the art that various modifications, alternate configurations and equivalents may be employed without departing from the spirit and scope of the present invention.

What is claimed is:

1. An electronic lock system for use with flat rigid cylinder-lock type keys, the electronic lock system comprising:

a keyway channel configured to accept one at a time, a plurality of purely mechanical, flat rigid cylinder-lock type keys, each of said keys having a keyway portion configured to be inserted into a corresponding keyway channel of a different purely mechanical lock, said keyway portion having a length dimension, a height dimension, and a thickness dimension, said length dimension, said thickness dimension, and said height dimension being mutually orthogonal and descending in size, said keyway portion having bitting cuts intended to position corresponding lock tumblers at corresponding heights, said bitting cuts perpendicular to said length dimension and said height dimension, each of said bitting cuts reducing at least a portion of a height of said keyway portion to form a bitting profile shape, said thickness dimension equal or less than approximately 0.1 inches, said keyway portions having different warding grooves parallel with the length dimension, the plurality of keys intended for use with the corresponding different purely mechanical locks, wherein the different purely mechanical locks have independent and incompatible warding and tumbler spacings and the plurality of keys have not been modified to be used with the electronic lock system;

a memory configured to store corresponding shape related information of said bitting profile shapes;

a sensor configured to sense at least a portion of the bitting profile shapes of flat rigid cylinder-lock type keys inserted into said keyway channel of the electronic locking system;

a comparator coupled to the memory and the sensor, the comparator configured to compare a sensed bitting profile shape with the stored shape related information stored in said memory; and an actuator configured to unlock the electronic locking system at least partially in response to the comparator determining that the sensed bitting profile shape corresponds to at least the portion of the stored shape related information.

2. The electronic lock system as defined in claim 1, wherein the sensor includes an inductive sensor having at least a first coil oriented so that a key inserted into the keyway is positioned at least near the coil, and wherein the inductive sensor provides information related to changes in inductance induced by the key.

3. The electronic lock system as defined in claim 1, wherein the sensor is configured to dynamically sense the key shape portion as the key is being inserted into the keyway.

4. The electronic lock system as defined in claim 1, wherein the sensor is configured to statically sense the key shape portion when the key insertion is complete.

5. The electronic lock system as defined in claim 1, further comprising a second sensor configured to sense at least a second key shape portion.

6. The electronic lock system as defined in claim 1, wherein the sensor includes a stylus positioned to trace at least a portion of a key bitting profile as the key is inserted into the keyway.

7. The electronic lock system as defined in claim 1, wherein the sensor includes at least two axially oriented coils configured to be driven from an AC source.

8. The electronic lock system as defined in claim 1, wherein the sensor senses an electromagnetic shadow of the portion of the key.

9. The electronic lock system as defined in claim 1, wherein the actuator allows the key to be rotated when unlocked.

10. The electronic lock system as defined in claim 1, wherein a rule set associated with a first of the plurality of stored key shape related information for a first of the plurality of mechanical keys limits the unlocking of the locking mechanism to a specified sequencing of key insertions.

11. The electronic lock system as defined in claim 1, wherein shape related information for a first key is stored in the memory in response to a user inserting the first key into the keyway and the user entering a code.

12. An electronic key-sensing system, comprising:
a locking mechanism, including a channel configured to accept one at a time at least a first flat rigid key and a second flat rigid key having keyway portions of different widths, and configured independent of the electronic key-sensing system, the first key and the second key being purely mechanical, cylinder-lock type keys having differently spaced bitting cuts on the corresponding keyway portions, the bitting cuts intended to position corresponding lock tumblers at corresponding heights, the first key and the second key having different warding patterns, wherein the first key and the second key are intended for use with corresponding different purely mechanical locking mechanisms having different respective incompatible keyway wardings and the first key and the second key have not been specially modified so as to operate the electronic key sensing system;
a programmable memory configured to store at least a first template for the first key and a second template for the second key;
a sensor configured to sense at least a portion of a shape of a key, including at least the bitting cuts, being used in an attempt to unlock the locking mechanism, the sensor configured to generate corresponding sensed shape information; and
an analysis circuit coupled to the memory and the sensor, the analysis circuit configured to determine if the sensed shape information corresponds with one of the stored first template and second template and to cause the unlocking of the locking mechanism at least partly in response to determining that the sensed shape information does correspond to one of the first stored template and the second stored template.

13. The electronic key sensing system as defined in claim 12, where the analysis circuit is located remotely from the keyway and sensor.

14. The method as defined in claim 12, wherein the sensed key portion includes a warding pattern.

15. An electronic lock system, comprising:
a non-warded keyway channel configured to accept one at a time a plurality of cylinder-lock type, purely mechanical keys having corresponding different bitting profiles and dimensions, including having keyway portions of corresponding different widths, wherein the keyway portions are intended to be inserted into keyway channels of corresponding different mechanical locks having different keyway wardings and different tumbler positions, the plurality of keys configured independent of the electronic lock system, wherein the plurality of purely mechanical keys are not altered in order to be used with the electronic lock system;
a memory configured to store corresponding shape related information for at least a portion of the plurality of mechanical keys;
a sensor configured to sense key shape information, including at least the bitting profile, of keys inserted into the keyway channel;
a comparator coupled to the memory and the sensor, the comparator configured to compare a sensed key shape portion with the stored shape related information; and
an unlocking mechanism configured to bring the electronic lock system into an unlocked state at least partially in response to the comparator determining that a sensed bitting profile shape inserted into the keyway channel substantially corresponds to at least a part of the stored shape related information.

* * * * *